(12) United States Patent
Minelli

(10) Patent No.: US 12,305,574 B2
(45) Date of Patent: *May 20, 2025

(54) GAS TURBINE ENGINE WITH IMPROVED HEAT MANAGEMENT

(71) Applicant: ROLLS-ROYCE plc, London (GB)

(72) Inventor: Andrea Minelli, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/372,825

(22) Filed: Sep. 26, 2023

(65) Prior Publication Data

US 2024/0110514 A1 Apr. 4, 2024

(30) Foreign Application Priority Data

Sep. 28, 2022 (GB) .................................. 2214148

(51) Int. Cl.
*F02C 7/16* (2006.01)
*F02C 3/06* (2006.01)
*F02C 7/36* (2006.01)

(52) U.S. Cl.
CPC ............... *F02C 7/16* (2013.01); *F02C 3/06* (2013.01); *F02C 7/36* (2013.01); *F05D 2260/213* (2013.01); *F05D 2260/4031* (2013.01)

(58) Field of Classification Search
CPC .... F02C 7/16; F02C 7/36; F02C 7/224; F02C 3/06; F05D 2260/213; F05D 2260/4031
See application file for complete search history.

(56) References Cited

U.S. PATENT DOCUMENTS

| 4,397,148 A | 8/1983 | Stockton et al. |
| 4,696,156 A | 9/1987 | Burr et al. |

(Continued)

FOREIGN PATENT DOCUMENTS

| CN | 215949660 U | 3/2022 |
| DE | 10 2023 126 196 A1 | 3/2024 |

(Continued)

OTHER PUBLICATIONS

Feb. 26, 2024 Extended European Search Report issued in European Application 23198863.5.

(Continued)

*Primary Examiner* — Steven M Sutherland
(74) *Attorney, Agent, or Firm* — Oliff PLC

(57) ABSTRACT

An aircraft gas turbine engine includes: an engine core including a compressor, combustor, turbine, and a core shaft connecting the turbine to the compressor; a fan including fan blades and arranged upstream of the engine core; turbomachinery bearings; a power gearbox to drive the fan at a lower rotation speed than the turbine; and a heat management system providing lubrication and cooling to the power gearbox and turbomachinery bearings, and including a pipe assembly adapted to provide a lubricant flow to the power gearbox and turbomachinery bearings to remove the heat generated by the power gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel.

20 Claims, 5 Drawing Sheets

(56) References Cited

U.S. PATENT DOCUMENTS

| | | |
|---|---|---|
| 5,012,646 A | 5/1991 | Speer |
| 5,553,449 A | 9/1996 | Rodgers et al. |
| 5,937,632 A * | 8/1999 | Dobbeling ............... F02C 3/20 |
| | | 60/39.12 |
| 6,182,435 B1 | 2/2001 | Niggemann et al. |
| 7,984,606 B2 | 7/2011 | Smith |
| 8,205,427 B2 | 6/2012 | Schwarz et al. |
| 9,051,056 B2 | 6/2015 | Leese |
| 10,208,675 B2 | 2/2019 | Mackin |
| 10,443,503 B2 | 10/2019 | Alecu et al. |
| 10,605,104 B2 | 3/2020 | Schwarz et al. |
| 10,641,182 B1 | 5/2020 | Bemment |
| 10,752,374 B1 | 8/2020 | Lui et al. |
| 11,053,815 B2 | 7/2021 | Schwarz et al. |
| 11,187,156 B2 * | 11/2021 | Niergarth ........... B01D 19/0005 |
| 11,492,969 B2 | 11/2022 | Bosak et al. |
| 2005/0081507 A1 | 4/2005 | Tumelty et al. |
| 2005/0097889 A1 | 5/2005 | Pilatis et al. |
| 2007/0264133 A1 | 11/2007 | Schwarz et al. |
| 2008/0028763 A1 | 2/2008 | Schwarz et al. |
| 2009/0078508 A1 | 3/2009 | DeLaloye |
| 2009/0255263 A1 | 10/2009 | Doerr et al. |
| 2011/0232293 A1 | 9/2011 | Leese |
| 2014/0200587 A1 | 7/2014 | Pompee et al. |
| 2015/0048617 A1 | 2/2015 | Veilleux, Jr. |
| 2015/0361811 A1 | 12/2015 | Schwarz et al. |
| 2015/0361887 A1 | 12/2015 | Stearns et al. |
| 2016/0024968 A1 | 1/2016 | Stearns et al. |
| 2016/0281603 A1 | 9/2016 | Appukuttan |
| 2016/0332743 A1 | 11/2016 | Teicholz et al. |
| 2017/0335770 A1 | 11/2017 | Glahn et al. |
| 2017/0336149 A1 | 11/2017 | Ribarov et al. |
| 2019/0063330 A1 | 2/2019 | Sheridan |
| 2019/0145317 A1 | 5/2019 | Holt |
| 2019/0316522 A1 | 10/2019 | Menczykalski et al. |
| 2020/0332715 A1 | 10/2020 | Ribarov |
| 2021/0172375 A1 | 6/2021 | Bosak et al. |
| 2021/0190008 A1 | 6/2021 | Gaskell et al. |
| 2022/0042463 A1 | 2/2022 | Molesini et al. |
| 2022/0403779 A1 | 12/2022 | Walz et al. |
| 2023/0332543 A1 | 10/2023 | Bemment et al. |
| 2024/0018904 A1 | 1/2024 | Oriol et al. |
| 2024/0110514 A1 | 4/2024 | Minelli |
| 2024/0110517 A1 | 4/2024 | Minelli |

FOREIGN PATENT DOCUMENTS

| | | |
|---|---|---|
| EP | 1 923 542 A2 | 5/2008 |
| EP | 3 246 531 A1 | 11/2017 |
| EP | 3 726 028 A1 | 10/2020 |
| FR | 3 140 132 A1 | 3/2024 |
| GB | 2493291 A | 1/2013 |
| GB | 2533132 A | 6/2016 |
| GB | 2536803 A | 9/2016 |
| WO | 2014/143282 A1 | 9/2014 |

OTHER PUBLICATIONS

Feb. 28, 2024 Office Action issued in U.S. Appl. No. 18/169,667.
Mar. 1, 2024 Combined Search Report and Examination Report issued in British Application No. 2314445.4.
U.S. Appl. No. 18/169,667, filed Feb. 15, 2023 in the name of Minelli.
U.S. Appl. No. 18/169,611, filed Feb. 15, 2023 in the name of Minelli.
U.S. Appl. No. 18/169,619, filed Feb. 15, 2023 in the name of Minelli.
U.S. Appl. No. 18/169,658, filed Feb. 15, 2023 in the name of Minelli.
Jul. 5, 2023 Office Action issued in U.S. Appl. No. 18/169,658.
Jul. 5, 2023 Office Action issued in U.S. Appl. No. 18/169,619.
Jul. 5, 2023 Office Action issued in U.S. Appl. No. 18/169,611.
Aug. 1, 2023 Office Action Issued In U.S. Appl. No. 18/169,667.
Oct. 23, 2023 Office Action issued in U.S. Appl. No. 18/169,619.
Oct. 23, 2023 Office Action issued in U.S. Appl. No. 18/169,611.
Oct. 24, 2023 Office Action issued in U.S. Appl. No. 18/169,667.
U.S. Appl. No. 18/372,836, filed Sep. 26, 2023 in the name of Minelli.
U.S. Appl. No. 18/372,814, filed Sep. 26, 2023 in the name of Minelli.
Nov. 2, 2023 Office Action issued in U.S. Appl. No. 18/169,658.
Institute of Thermal Turbomachinery and Machine Dynamics, Graz University of Technology, 5.1.5 Atmospheric Temperatures [ Aeroengine Safety], Aug. 16, 2022, pp. 1-13. Downloaded from https://web.archive.Org/web/20220816064010/https:// aeroenginesafety.tugraz.at/doku.php?id=5:51:515:515 on Jul. 18, 2024. (Year: 2022).
Feb. 29, 2024 Combined Search and Examination Report issued in British Patent Application No. 2314447.0.
Mar. 1, 2024 Combined Search and Examination Report issued in British Patent Application No. 2314444.7.
Mar. 1, 2024 Combined Search and Examination Report issued in British Patent Application No. 2314442.1.
Mar. 1, 2024 Combined Search and Examination Report issued in British Patent Application No. 2314448.8.
Mar. 1, 2024 Combined Search and Examination Report issued in British Patent Application No. 2314446.2.
Jun. 6, 2024 U.S. Office Action issued in U.S. Appl. No. 18/169,658.
EASA, Type-Certificate Data Sheet No. EASA E.047 for the RB211 Trent 800 series, EASA, Feb. 21, 2015, Issue 04 (Year: 2015).
Oct. 29, 2024 Notice of Allowance issued in U.S. Appl. No. 18/169,667.
Feb. 5, 2025 Office Action issued in British Application No. GB2314445.4.

* cited by examiner

GAS TURBINE ENGINE WITH IMPROVED HEAT MANAGEMENT

CROSS-REFERENCE TO RELATED APPLICATIONS

This specification is based upon and claims the benefit of priority from UK Patent Application Number 2214148.5 filed on Sep. 28, 2022, the entire contents of which are incorporated herein by reference.

BACKGROUND

1. Field of the Disclosure

The present disclosure relates to a gas turbine engine, and particularly to a gas turbine engine with an improved heat management system.

2. Description of the Related Art

Gas turbine engines are generally used to power aircrafts, and the like. A gas turbine engine generally comprises an air intake, a fan, one or more compressors, a combustor, one or more turbines, and an exhaust nozzle. Air entering the air intake is compressed by the compressor, mixed with fuel and then fed into the combustor, where combustion of the air/fuel mixture occurs. The high temperature and high energy exhaust fluids are then fed to the turbine, where the energy of the fluids is converted to mechanical energy to drive the compressor and the fan in rotation by suitable interconnecting shaft(s) to provide propulsive thrust.

Gas turbine engines comprises turbomachinery bearings provided between rotating and stationary parts of the engine, for example at either end of the interconnecting shaft(s). Such turbomachinery bearings require adequate lubrication and cooling under all foreseeable operating conditions to perform optimally, minimise any wearing, and therefore increase operating life. To this purpose, an oil system is provided. Heat removed from the turbomachinery bearings by the oil system is then dissipated to air and/or fuel to achieve benefits in terms of Specific Fuel Consumption (SFC).

A general aim for a gas turbine engine is to improve efficiency and therefore reduce fuel consumption. As it is generally recognised that moving more air at a slower rate is an efficient way of achieving a given thrust and therefore improving SFC, geared architectures, in which a fan of increased diameter is driven through a power gearbox at a lower rotational speed than the compressor, have been developed. The power gearbox, in addition to the turbomachinery bearings, generates heat, which needs to be removed to assure correct and efficient functioning. However, the additional amount of heat generated by the power gearbox, if dissipated to fuel, contributes to risk of fuel thermal degradation at specific operating conditions.

Such risk is even more severe in geared gas turbine engines with lean burn combustors. Lean burn is a combustion technology that aims at reducing nitrous oxides (NOx), which begin forming at high temperatures and increase exponentially with increasing temperature. In lean burn combustion the air-to-fuel ratio (AFR) is higher than a stoichiometric ratio, which allows to keep the combustion temperature within limits known to reduce NOx production. However, lean burn gas turbine engines pose severe constraints in terms of amount of heat that can be dissipate to fuel. For example, in fuel spray nozzles with pilot and mains streams, when the mains stream is staged out (turned off), the fuel in the mains stream is generally stagnant and therefore picks up heat which is undesirable due to fuel thermal degradation.

Simply increasing the amount of heat dissipated to air may be neither technically feasible due to limited oil-to-air heat exchanging capacity available, nor energetically advantageous, as it would increase the amount of wasted energy, and at the same time would not guarantee correct functioning of the engine under all operating conditions.

In substance, geared gas turbine engines, and in particular geared gas turbine engines with lean burn combustors, provide new challenges in terms of management of heat generated by the engine components.

There is therefore a need to provide a gas turbine engine with an improved heat management system which allow to minimise energy waste, improve Specific Fuel Consumption, and provide effective cooling to the engine components, among which the power gearbox and turbomachinery bearings, under all foreseeable operating conditions.

SUMMARY

Accordingly there is provided a gas turbine engine according to claim 1.

According to an aspect there is provided a gas turbine engine for an aircraft comprising: an engine core comprising a compressor, a combustor, a turbine, and a core shaft connecting the turbine to the compressor, wherein the core shaft has a core shaft maximum take-off speed in the range of from 5500 rpm to 9500 rpm, preferably in the range of from 5500 rpm to 8500 rpm; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel, wherein the heat management system is configured to provide the first amount of heat and the second amount of heat such that a first proportion of heat generated by the gearbox and the turbomachinery and dissipated to air defined as $$\left(\frac{\text{first amount of heat 111}}{\text{first amount of heat 111} + \text{second amount of heat 112}}\right)_{85\% \, MTO}$$

at 85% of the core shaft maximum take-off speed is in the range of from 0.25 to 0.70.

As used herein, proportions correspond to percentages, and vice versa, and therefore, for example, a proportion of 0.5 corresponds to 50% and a proportion of 1 corresponds to 100%.

In other words, at 85% of a core shaft maximum take-off speed from 25% to 70% of the heat generated by the power gearbox and the turbomachinery is dissipated to the first heat sink (the remainder of the heat generated by the power gearbox and the turbomachinery being dissipated to the second heat sink).

As used herein, maximum take-off (MTO) conditions have the conventional meaning. Maximum take-off conditions are defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine are therefore defined as operating the engine at a maximum take-off thrust (for example maximum throttle) for the engine at International Standard Atmosphere (ISA) sea level pressure and temperature +15° C. with a fan inlet velocity of 0.25 Mn. A core shaft maximum take-off speed (MTO speed) is the rotational speed of the core shaft under MTO conditions, and is measured in rpm (rounds per minute). The core shaft maximum take-off speed is generally identified amongst the engine performance data and/or in the engine type-certificate data sheet.

In the present disclosure, upstream and downstream are with respect to the air flow through the compressor; and front and rear is with respect to the gas turbine engine, i.e. the fan being in the front and the turbine being in the rear of the engine.

In the present disclosure, the term "turbomachinery bearings" includes any component of the gas turbine engine other than the power gearbox that generates heat and is cooled by the heat management system.

The heat generated by the power gearbox and turbomachinery bearings and removed by the lubricant flow is the sum of first amount of heat and the second amount of heat.

The present inventor has understood that providing a heat management system configured to provide specific proportions of heat dissipated to air at 85% of the core shaft maximum take-off speed, i.e. at a speed at, or close to, cruise conditions, and a core shaft with a maximum take-off speed in a specific range allows to provide adequate lubrication and cooling to the power gearbox and the turbomachinery bearings, minimise the size and therefore the weight of the heat exchangers, and maximise SFC benefits for the longest phase of flight.

To configure the heat management system to achieve the specific proportions of heat dissipated to air several design and/or operational parameters may be used. For example, one or more of the following parameters may be used: the type (for example parallel or counterflow), the efficiency, the number, and the area of the heat exchange surface of the air-lubricant and fuel-lubricant heat exchangers, the flow conditions of the lubricant, for example the lubricant mass flow rate passing across each of the air-lubricant heat exchanger(s) and the fuel-lubricant heat exchanger(s), the ratio of the lubricant mass flow rate passing across the air-lubricant heat exchanger(s) to the lubricant mass flow rate passing across the fuel-lubricant heat exchanger(s), and the flow condition of the cooling air, for example the cooling air mass flow rate. For example, increasing (or decreasing) the total heat exchange surface of the at least one air-lubricant heat exchanger between the lubricant and the first heat sink would increase (or decrease) the first amount of heat dissipated to the first sink; increasing (or decreasing) the lubricant mass flow rate to the air-lubricant heat exchanger(s), and/or increasing (or decreasing) the cooling air mass flow rate, would increase (or decrease) the first amount of heat dissipated to the first sink. Analogously increasing (or decreasing) the total heat exchange surface of the at least one fuel-lubricant heat exchanger between the lubricant and the second heat sink would increase (or decrease) the second amount of heat dissipated to the second sink; increasing (or decreasing) the lubricant mass flow rate to the fuel-lubricant heat exchanger(s) would increase (or decrease) the second amount of heat dissipated to the second sink.

The pipe assembly may comprise a lubricant bypass to either or both of the at least one air-lubricant and the at least one fuel-lubricant heat exchangers. By adjusting the lubricant mass flow rate in the bypass and across the heat exchangers the amount of heat dissipated to the first and second heat sinks may be further adjusted. In embodiments, the lubricant bypass may be embedded in, and be part of, the at least one air-lubricant and the at least one fuel-lubricant heat exchanger.

The core shaft maximum take-off speed may be in the range of from 5500 rpm to 7500 rpm, preferably in the range of from 5500 rpm to 6500 rpm.

The first proportion may be, greater than 0.25, or greater than 0.30, or greater than 0.35, or greater than 0.40, or greater than 0.45, or greater than 0.50, or greater than 0.55, and less than 0.70, or less than 0.65, for example in the range of from 0.25 to 0.70, or in the range of from 0.35 to 0.70, or in the range of from 0.45 to 0.70, or in the range of from 0.50 to 0.70, or in the range of from 0.55 to 0.70, or in the range of from 0.55 to 0.65.

A second proportion of heat generated by the gearbox and the turbomachinery and dissipated to air is defined as $$\left(\frac{\text{first amount of heat 111}}{\text{first amount of heat 111} + \text{second amount of heat 112}}\right)_{65\% \ MTO}$$

at 65% of the core shaft maximum take-off speed, and the heat management system may be configured to provide the first amount of heat and the second amount of heat such that the second proportion of heat generated by the gearbox and the turbomachinery and dissipated to air is in the range of from 0.60 to 1, preferably in the range of from 0.70 to 1, more preferably in the range of from 0.75 to 1.

The second proportion may be greater than 0.60, or greater than 0.65, or greater than 0.70, or greater than 0.75, and less than 1, or less than 0.95, for example in the range of from 0.60 to 1, or in the range of from 0.65 to 1, or in the range of from 0.70 to 1, or in the range of from 0.75 to 1, or in the range of from 0.75 to 0.95.

The first heat sink may be bypass air flowing across a bypass duct of the gas turbine engine.

The heat management system may be adapted to provide a heat ratio of the first proportion to the second proportion in the range of from 0.45 to 0.65, preferably from 0.45 to 0.60, more preferably from 0.47 to 0.58.

Moreover, the environment conditions, and in particular the environment temperature may have an impact on the capacity of the first heat sink and of the second heat sink to dissipate heat generated by the power gearbox and the turbomachinery bearings. The inventor has found that such capacity does not vary with the environment temperature in the same way for the first and second heat sinks. In other words, the relative amounts of heat that (external or bypass) air and fuel can reject may vary with temperature.

For this reason, the heat management system may be configured to vary the first amount of heat and the second amount of heat at different environmental temperatures such as to provide specific first and second proportions which allow to maximise the second amount of heat, and therefore maximise SFC, minimise the total heat exchange surface of the heat exchangers, without incurring fuel degradation.

As engines are normally certified to operate in a range of environment temperatures between ISA (International Standard Atmosphere) −69° C. and ISA +40° C., the heat management system may be configured to vary the first amount of heat and the second amount of heat, and therefore the first and second proportions, to maximise SFC, minimise the dimensions (and therefore the weight) of the heat exchangers, without incurring fuel degradation, depending on the environment temperature.

The heat management system may be configured to provide the first proportion and the second proportion within the above disclosed ranges for environmental temperatures in the range of from ISA −69° C. and ISA +40° C.

Moreover the heat management system may be configured to provide the first proportion at an environment temperature of ISA+40° C. in the range of from 0.55 to 0.70, preferably in the range of from 0.60 to 0.70, preferably in the range of from 0.62 to 0.68.

As the environment temperature decreases, air and fuel temperatures decrease, and the amount of heat that can be rejected to air and fuel increases, as though not proportionally to each other. Accordingly, to maximise SFC, minimise the dimensions (and therefore the weight) of the heat exchangers without incurring fuel degradation, the heat management may also be configured to provide the first proportion within specific ranges at different environment temperatures.

At an environment temperature of ISA −69° C. the heat management may be configured to provide the first amount of heat and the second amount of heat such as to provide the first proportion in the range of from 0.20 to 0.40, preferably in the range of from 0.20 to 0.35, more preferably in the range of from 0.20 to 0.30.

At an environment temperature of ISA +10° C. the heat management system may be configured to provide the first amount of heat and the second amount of heat such as to provide the first proportion in the range of from 0.35 to 0.65, preferably in the range of from 0.40 to 0.60, more preferably in the range of from 0.45 to 0.55.

As the first proportion is defined at a core shaft speed corresponding to, or close to, cruise conditions, by providing the first and second amounts of heat such as to provide the first proportion within the above ranges, SFC can be maximised for the whole range of temperatures for which an engine is certified.

The heat management system may be configured to provide the second proportion within specific ranges that have proved to be safe in terms of fuel degradation, and maximise SFC and minimise the dimensions (and therefore the weight) of the heat exchangers, at different environment temperatures. In particular, at an environment temperature of ISA +40° C. the heat management system may be configured to provide the second proportion in the range of from 0.85 to 1, or from 0.90 to 1, or from 0.92 to 1, or from 0.92 to 0.98. At an environment temperature of ISA −69° C. the heat management system may be configured to provide the second proportion in the range of from 0.40 to 0.75, or in the range of from 0.50 to 0.75, or in the range of from 0.55 to 0.70. At an environment temperature of ISA +10° C. the heat management system may be configured to provide the second proportion in the range of from 0.60 to 0.95, or in the range of from 0.70 to 0.95, or in the range of from 0.75 to 0.95, or in the range of from 0.80 to 0.92.

At an environment temperature of ISA +40° C. the heat management system may be configured to provide a heat ratio of the first proportion to the second proportion in the range of from 0.50 to 0.80, or in the range of from 0.55 to 0.75, or in the range of from 0.60 to 0.70, or in the range of from 0.60 to 0.67.

At an environment temperature of ISA +10° C. the heat management system may be configured to provide a heat ratio of the first proportion to the second proportion in the range of from 0.45 to 0.65, or in the range of from 0.45 to 0.60, or in the range of from 0.50 to 0.60, or in the range of from 0.50 to 0.58, or in the range of from 0.47 to 0.58.

At an environment temperature of ISA −69° C. the heat management system may be configured to provide a heat ratio of the first proportion to the second proportion in the range of from 0.30 to 0.55, preferably in the range of from 0.30 to 0.50, more preferably in the range of from 0.35 to 0.45.

Moreover the heat management system may be configured to provide a ratio of the first proportion at an environment temperature of ISA +40° C. to the first proportion at an environment temperature of ISA −69° C. in the range of from 1.5 to 4.5, preferably in the range of from 2.0 to 4.0, more preferably in the range of from 2.0 to 3.5.

The heat management system may be configured to provide a ratio of the second proportion at an environment temperature of ISA +40° C. to the second proportion at an environment temperature of ISA −69° C. in the range of from 1.0 to 2.1, preferably in the range of from 1.2 to 2.1, more preferably in the range of from 1.4 to 2.0.

Moreover the heat management system may be configured to provide a ratio of the first proportion at an environment temperature of ISA +40° C. to the first proportion at an environment temperature of ISA +10° C. in the range of from 1.20 to 1.42, or in the range of from 1.22 to 1.41, or in the range of from 1.25 to 1.40.

Moreover the heat management system may be configured to provide the first amount of heat and the second amount of heat such that a ratio of the second proportion at an environment temperature of ISA +40° C. to the second proportion at an environment temperature of ISA +10° C. in the range of from 1.10 to 1.25, or in the range of from 1.10 to 1.22, or in the range of from 1.11 to 1.20.

The heat management system may be configured to provide the first amount of heat and the second amount of heat such that a proportion of heat generated by the power gearbox and the turbomachinery and dissipated to air is greater than $A\ NH + B$, and less than 1, wherein A is equal to −1.15, B is equal to, or greater than, 1.48, and NH is a core shaft speed expressed as a proportion of the core shaft maximum take-off speed and is in the range of from 0.65 to 1.

B may be equal to, or greater than, 1.5, or 1.52, or 1.54, or 1.56.

In other words, when NH is 0.65 the core shaft speed is 65% of the core shaft maximum take-off speed, and when NH is 1 the core shaft speed is 100% of, or equal to, the core shaft B may be equal to, or greater than, 1.5, or 1.52, or 1.54, or 1.56.

The heat management system may be configured to provide the first amount of heat and the second amount of heat such that the proportion of heat generated by the power gearbox and the turbomachinery and dissipated to air is
  less than the lower of 1 and $CNH + D$,
    wherein C is equal to −1.84, D is in the range of from 2.10 to 2.30, and NH is in the range of from 0.65 to 1.
  D may be in the range of from 2.18 to 2.30, or in the range of from 2.18 to 2.25, or in the range of from 2.20 to 2.25.

The heat management system may be configured to provide the first amount of heat and the second amount of heat such that the proportion of heat generated by the power gearbox and the turbomachinery and dissipated to air is greater than A·NH+B, and less than the lower of 1 and E·(NH−1)+F, wherein A is equal to −1.15, B is equal to, or greater than, 1.48, E is in the range of from −1.16 to −3, F is equal to, or greater than, 0.37, and NH is the core shaft speed expressed as proportion of the core shaft maximum take-off speed and is in the range of from 0.65 to 1.

B may be equal to, or greater than, 1.5, or 1.52, or 1.54, or 1.56.

E may be in the range of from −1.16 to −2.5, or in the range of from −1.16 to −1.95.

In the above embodiments, the core shaft speed NH may be in the range of from 0.65 to 0.95, or in the range of from 0.65 to 0.90, or in the range of from 0.65 to 0.85.

The fan may have a fan diameter in the range of from 210 cm to 380 cm.

The power gearbox may have a gear ratio in the range of from 2.9 to 4.0, or from 3.0 to 3.8.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor, wherein the core shaft has a core shaft maximum take-off speed in the range of from 5500 rpm to 9500 rpm, preferably in the range of from 5500 rpm to 8500 rpm; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; and wherein the method comprises the step of operating the heat management system to provide the first amount of heat and the second amount of heat such that a first proportion of heat generated by the gearbox and the turbomachinery and dissipated to air defined as $$\left(\frac{\text{first amount of heat 111}}{\text{first amount of heat 111} + \text{second amount of heat 112}}\right)85\%\ MTO$$

at 85% of the core shaft maximum take-off speed is in the range of from 0.25 to 0.70.

The first proportion of heat generated by the gearbox and the turbomachinery and dissipated to air may be in the range of from 0.35 to 0.70, preferably in the range of from 0.45 to 0.70, more preferably in the range of from 0.50 to 0.70.

The method may comprise the step of operating the heat management system to provide at an environment temperature of ISA +40° C. the first amount of heat and the second amount of heat such that the first proportion of heat generated by the gearbox and the turbomachinery and dissipated to air at 85% of the core shaft maximum take-off speed is in the range of from 0.55 to 0.75, preferably in the range of from 0.55 to 0.70, more preferably in the range of from 0.60 to 0.70.

The method may comprise the step of operating the heat management system to provide the first amount of heat and the second amount of heat such that a ratio of the first proportion at an environment temperature of ISA +40° C. to the first proportion at an environment temperature of ISA −69° C. is in the range of from 1.5 to 4.5, preferably in the range of from 2.0 to 4.0, more preferably in the range of from 2.0 to 3.5

The method may comprise the step of operating the heat management system to provide the first amount of heat and the second amount of heat such that a ratio of the first proportion at an environment temperature of ISA +40° C. to the first proportion at an environment temperature of ISA +10° C. is in the range of from 1.20 to 1.42, preferably in the range of from 1.22 to 1.41, more preferably in the range of from 1.25 to 1.40.

According to an aspect, there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the power gearbox and turbomachinery bearings, and comprising a pipe assembly adapted to provide a lubricant flow to the power gearbox and turbomachinery bearings to remove the heat generated by the power gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel. A first proportion of the heat generated by the power gearbox and the turbomachinery and dissipated to air is defined as $$\left(\frac{\text{first amount of heat}}{\text{first amount of heat} + \text{second amount of heat}}\right)85\%\ MTO$$

at 85% of a core shaft maximum take-off speed, and a second proportion of the heat generated by the power gearbox and the turbomachinery and dissipated to air is defined as $$\left(\frac{\text{first amount of heat}}{\text{first amount of heat} + \text{second amount of heat}}\right)65\%\ MTO$$

at 65% of the core shaft maximum take-off speed. The thermal management system is configured to provide the first amount of heat and the second amount of heat such that the first proportion is in the range of from 0.25 to 0.70, and the second proportion is in the range of from 0.60 to 1.

As used herein, proportions correspond to percentages, and vice versa, and therefore, for example, a proportion of 0.5 correspond to 50% and a proportion of 1 correspond to 100%.

In other words, at 85% of a core shaft maximum take-off speed from 25% to 70% of the heat generated by the power gearbox and the turbomachinery is dissipated to the first heat sink (the remainder of the heat generated by the power gearbox and the turbomachinery being dissipated to the second heat sink), and at 65% of the core shaft maximum take-off speed from 60% to 100% of the heat generated by the power gearbox and the turbomachinery is dissipated to the first heat sink (the remainder of the heat generated by the power gearbox and the turbomachinery being dissipated to the second heat sink).

The present inventor has understood that providing a heat management system configured to provide specific proportions of heat dissipated to air at 65% of the core shaft maximum take-off speed, i.e. at a speed at, or close to, flight idle, and at 85% of the core shaft maximum take-off speed, i.e. at a speed at, or close to, cruise conditions, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

The first proportion may be, greater than 0.25, or greater than 0.30, or greater than 0.35, or greater than 0.40, or greater than 0.45, or greater than 0.50, or greater than 0.55, and less than 0.70, or less than 0.65, for example in the range of from 0.25 to 0.70, or in the range of from 0.35 to 0.70, or in the range of from 0.45 to 0.70, or in the range of from 0.50 to 0.70, or in the range of from 0.55 to 0.70, or in the range of from 0.55 to 0.65.

The second proportion may be greater than 0.60, or greater than 0.65, or greater than 0.70, or greater than 0.75, and less than 1, or less than 0.95, for example in the range of from 0.60 to 1, or in the range of from 0.65 to 1, or in the range of from 0.70 to 1, or in the range of from 0.75 to 1, or in the range of from 0.75 to 0.95.

The first heat sink may be bypass air flowing across a bypass duct of the gas turbine engine.

The heat management system may be adapted to provide a heat ratio of the first proportion to the second proportion in the range of from 0.45 to 0.65, preferably from 0.45 to 0.60, more preferably from 0.47 to 0.58.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The heat management system may include a modulation device adapted to adjust a lubricant flow distribution between the power gearbox and the turbomachinery bearings.

The modulation device may include a first pump device arranged in the first lubricant circuit to adjust the first lubricant flow and a second pump device arranged in the second lubricant circuit to adjust the second lubricant flow.

The first lubricant circuit may provide lubrication and cooling to the power gearbox.

The second lubricant circuit may provide lubrication and cooling to the turbomachinery bearings.

The gas turbine engine may comprise at least two air-lubricant heat exchangers to dissipate the first amount of heat to the first heat sink, of which at least one is arranged in the first lubricant circuit and at least one is arranged in the second lubricant circuit.

The heat management system may comprise a lubricant tank in fluid communication with, and feeding lubricant to, the first and second lubricant circuits.

The heat management system may comprise a first lubricant tank in fluid communication with, and feeding lubricant to, the first lubricant circuit and a second lubricant tank in fluid communication with, and feeding lubricant to, the second lubricant circuit.

The fan may have a fan diameter in the range of from 210 cm to 380 cm, or from 210 cm to 370 cm, or from 220 cm to 370 cm, for example from 340 to 370.

The power gearbox may have a gear ratio in the range of from 2.9 to 4.0, or from 3.0 to 3.8, or from 3.1 to 3.7.

The at least one air-lubricant heat exchanger may be a Matrix Air-Cooled Oil Cooler (MACOC).

The combustor may be a lean burn combustor. The lean burn combustor may comprise a plurality of lean burn fuel spray nozzles, each fuel spray nozzle comprising a pilot fuel injector and a main fuel injector.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the power gearbox and turbomachinery bearings, and comprising a pipe assembly adapted to provide a lubricant flow to the power gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel. A first proportion of heat generated by the power gearbox and the turbomachinery and dissipated to air is defined as $$\left(\frac{\text{first amount of heat}}{\text{first amount of heat} + \text{second amount of heat}}\right)_{85\% \; MTO}$$

at 85% of a core shaft maximum take-off speed, and
a second proportion of heat generated by the power gearbox and the turbomachinery and dissipated to air is defined as $$\left(\frac{\text{first amount of heat}}{\text{first amount of heat} + \text{second amount of heat}}\right)_{65\% \; MTO}$$

at 65% of the core shaft maximum take-off speed,
wherein the method comprises the step of operating the heat management system to provide the first amount of heat and the second amount of heat such that the first proportion is in the range of from 0.25 to 0.70 and the second proportion is in the range of from 0.60 to 1.

The first proportion may be, greater than 0.25, or greater than 0.30, or greater than 0.35, or greater than 0.40, or greater than 0.45, or greater than 0.50, or greater than 0.55, and less than 0.70, or less than 0.65, for example in the range of from 0.25 to 0.70, or in the range of from 0.35 to 0.70, or in the range of from 0.45 to 0.70, or in the range of from 0.50 to 0.70, or in the range of from 0.55 to 0.70, or in the range of from 0.55 to 0.65.

The second proportion may be greater than 0.60, or greater than 0.65, or greater than 0.70, or greater than 0.75, and less than 1, or less than 0.95, for example in the range of from 0.60 to 1, or in the range of from 0.65 to 1, or in the range of from 0.70 to 1, or in the range of from 0.75 to 1, or in the range of from 0.75 to 0.95.

The method may comprise the step of operating the heat management system to provide the first amount of heat and the second amount of heat such that a heat ratio of the first proportion to the second proportion is in the range of from 0.45 to 0.65, or in the range of from 0.45 to 0.60, or in the range of from 0.47 to 0.58.

According to an aspect, there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings to remove the heat generated by the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel;

wherein a first proportion of heat generated by the gearbox and the turbomachinery and dissipated to air is defined as $$\left(\frac{\text{first amount of heat 111}}{\text{first amount of heat 111} + \text{second amount of heat 112}}\right)_{85\% \, MTO}$$

at 85% of a core shaft maximum take-off speed, wherein a second proportion of heat generated by the gearbox and the turbomachinery and dissipated to air is defined as $$\left(\frac{\text{first amount of heat 111}}{\text{first amount of heat 111} + \text{second amount of heat 112}}\right)_{65\% \, MTO}$$

at 65% of the core shaft maximum take-off speed; and wherein the heat management system is configured to provide at an environment temperature of ISA +10° C. the first amount of heat and the second amount of heat such that a ratio of the first proportion to the second proportion is in the range of from 0.45 to 0.65.

As used herein, proportions correspond to percentages, and vice versa, and therefore, for example, a proportion of 0.5 correspond to 50% and a proportion of 1 correspond to 100%.

The present inventor has understood that providing a heat management system configured to provide, at a temperature of ISA +10° C., i.e. in relatively hot days, specific proportions of heat dissipated to air at 65% of the core shaft maximum take-off speed, i.e. at a speed at, or close to, flight idle, and at 85% of the core shaft maximum take-off speed, i.e. at a speed at, or close to, cruise conditions, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

At an environment temperature of ISA +10° C. the ratio of the first proportion of heat generated by the gearbox and the turbomachinery and dissipated to air to the second proportion of heat generated by the gearbox and the turbomachinery and dissipated to air may be in the range of from 0.45 to 0.60, preferably in the range of from 0.47 to 0.58.

The heat management system may be configured to provide the first amount of heat and the second amount of heat such that the first proportion of heat generated by the gearbox and the turbomachinery and dissipated to air may be in the range of from 0.25 to 0.70, preferably in the range of from 0.35 to 0.70, more preferably in the range of from 0.45 to 0.70, even more preferably in the range of from 0.50 to 0.70.

The heat management system may be configured to provide the first amount of heat and the second amount of heat such that the second proportion of heat generated by the gearbox and the turbomachinery and dissipated to air is in the range of from 0.60 to 1, preferably in the range of from 0.70 to 1, more preferably in the range of from 0.75 to 1.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The core shaft maximum take-off speed may be in the range of from 5500 rpm to 9500 rpm, preferably in the range of from 5500 rpm to 8500 rpm.

The fan may have a fan rotational speed at MTO conditions in the range of from 1500 rpm to 2800 rpm, preferably in the range of from 1600 rpm to 2500 rpm, more preferably in the range of from 1600 rpm to 2200 rpm The heat management system may be configured to provide at an environment temperature of ISA +40° C. the first amount of heat and the second amount of heat such that the first proportion of heat generated by the gearbox and the turbomachinery and dissipated to air at 85% of the core shaft maximum take-off speed is in the range of from 0.55 to 0.70, preferably in the range of from 0.60 to 0.70.

The heat management system may be configured to provide at an environment temperature of ISA +40° C. the first amount of heat and the second amount of heat such that the second proportion of heat generated by the gearbox and the turbomachinery and dissipated to air at 65% of the core shaft maximum take-off speed is in the range of from 0.85 to 1, preferably in the range of from 0.90 to 1.

The heat management system may be configured to provide at an environment temperature of ISA −69° C. the first amount of heat and the second amount of heat such that the ratio of the first proportion to the second proportion is in the range of from 0.30 to 0.55, preferably in the range of from 0.35 to 0.45.

The heat management system may be configured to provide the first amount of heat and the second amount of heat such that the first proportion is in the range of from 0.40 to 0.60 at an environment temperature of ISA +10° C., and the second proportion at an environment temperature of ISA +10° C. is in the range of from 0.80 to 0.92.

The heat management system may be configured to provide the first amount of heat and the second amount of heat such that a ratio of the first proportion at an environment temperature of ISA +40° C. to the first proportion at an environment temperature of ISA −69° C. is in the range of from 1.5 to 4.5, preferably in the range of from 2.0 to 4.0, more preferably in the range of from 2.0 to 3.5.

The heat management system may be configured to provide the first amount of heat and the second amount of heat such that a ratio of the second proportion at an environment temperature of ISA +40° C. to the second proportion at an environment temperature of ISA −69° C. is in the range of from 1.0 to 2.1, preferably in the range of from 1.2 to 2.1, more preferably in the range of from 1.4 to 2.0.

The heat management system may be configured to provide the first amount of heat and the second amount of heat such that a ratio of the first proportion at an environment temperature of ISA +40° C. to the first proportion at an environment temperature of ISA +10° C. is in the range of from 1.20 to 1.42, preferably in the range of from 1.22 to 1.41, more preferably in the range of from 1.25 to 1.40.

The heat management system may be configured to provide the first amount of heat and the second amount of heat such that a ratio of the second proportion at an environment temperature of ISA +40° C. to the second proportion at an environment temperature of ISA +10° C. is in the range of from 1.10 to 1.25, preferably in the range of from 1.10 to 1.22, more preferably in the range of from 1.11 to 1.20.

According to an aspect, there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; and
 wherein a first proportion of heat generated by the gearbox and the turbomachinery and dissipated to air is defined as $$\left(\frac{\text{first amount of heat 111}}{\text{first amount of heat 111} + \text{second amount of heat 112}}\right)85\%\ MTO$$

at 85% of a core shaft maximum take-off speed, and
a second proportion of heat generated by the gearbox and the turbomachinery and dissipated to air is defined as $$\left(\frac{\text{first amount of heat 111}}{\text{first amount of heat 111} + \text{second amount of heat 112}}\right)65\%\ MTO$$

at 65% of the core shaft maximum take-off speed,
 wherein the method comprises the step of operating the heat management system to provide at an environment temperature of ISA +10° C. the first amount of heat and the second amount of heat such that a ratio of the first proportion to the second proportion is in the range of from 0.45 to 0.65.

The ratio may be in the range of from 0.45 to 0.60, preferably in the range of from 0.47 to 58.

The method may comprise the step of operating the heat management system to provide the first amount of heat and the second amount of heat such that the first proportion of heat generated by the gearbox and the turbomachinery and dissipated to air is in the range of from 0.25 to 0.70, preferably in the range of from 0.35 to 0.70, more preferably in the range of from 0.45 to 0.70, even more preferably in the range of from 0.50 to 0.70.

The method may comprise the step of operating the heat management system to provide the first amount of heat and the second amount of heat such that the second proportion of heat generated by the gearbox and the turbomachinery and dissipated to air is in the range of from 0.60 to 1, preferably in the range of from 0.70 to 1, more preferably in the range of from 0.75 to 1.

The method may comprise the step of operating the heat management system to provide at an environment temperature of ISA +40° C. the first amount of heat and the second amount of heat such that the first proportion of heat generated by the gearbox and the turbomachinery and dissipated to air at 85% of the core shaft maximum take-off speed is in the range of from 0.55 to 0.75, preferably in the range of from 0.55 to 0.70, more preferably in the range of from 0.60 to 0.70; and/or the step of operating the heat management system to provide at an environment temperature of ISA +40° C. the first amount of heat and the second amount of heat such that the second proportion of heat generated by the gearbox and the turbomachinery and dissipated to air at 65% of the core shaft maximum take-off speed is in the range of from 0.85 to 1, preferably in the range of from 0.90 to 1.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger adapted to receive cooling air from the bypass duct to dissipate a first amount of heat to a first heat sink, and at least one fuel-lubricant heat exchanger to dissipate a second amount of heat to a second heat sink; wherein the first heat sink is bypass air and the second heat sink is fuel, the method further comprising:
 operating the heat management system to provide the first amount of heat and the second amount of heat such that a first proportion of heat generated by the gearbox and the turbomachinery and dissipated to air defined as $$\left(\frac{\text{first amount of heat 111}}{\text{first amount of heat 111} + \text{second amount of heat 112}}\right)85\%\ MTO$$

at 85% of a core shaft maximum take-off speed is in the range of from 0.25 to 0.70; and
 operating the fan at cruise conditions to provide a fan pressure ratio in the range of from 1.35 to 1.43.

As used herein, proportions correspond to percentages, and vice versa, and therefore, for example, a proportion of 0.5 correspond to 50% and a proportion of 1 correspond to 100%.

In other words, at 85% of a core shaft maximum take-off speed from 25% to 70% of the heat generated by the power gearbox and the turbomachinery is dissipated to the first heat sink (the remainder of the heat generated by the power gearbox and the turbomachinery being dissipated to the second heat sink.

The present inventor has understood that providing a heat management system configured to provide specific proportions of heat dissipated to air at 85% of the core shaft maximum take-off speed, i.e. at a speed at, or close to, cruise conditions, and a fan configured to provide at cruise conditions a fan pressure ratio in a specific range allows to provide adequate lubrication and cooling to the power gearbox and the turbomachinery bearings, minimise the size and therefore the weight of the heat exchangers, maximise SFC benefits for the longest phase of flight.

The method may comprise operating the heat management system to provide the first amount of heat and the second amount of heat such that the first proportion is in the range of from 0.35 to 0.70, preferably in the range of from 0.45 to 0.70, more preferably in the range of from 0.50 to 0.70.

The method may comprise operating the heat management system to provide at an environment temperature of ISA +40° C. the first amount of heat and the second amount of heat such that the first proportion is in the range of from 0.55 to 0.70, preferably in the range of from 0.60 to 0.70.

The method may comprise operating the heat management system to provide at an environment temperature of ISA +10° C. the first amount of heat and the second amount of heat such that the first proportion is in the range of from 0.35 to 0.65, preferably in the range of from 0.40 to 0.60, more preferably in the range of from 0.45 to 0.55.

The method may comprise operating the heat management system to provide the first amount of heat and the second amount of heat such that a ratio of the first proportion at an environment temperature of ISA +40° C. to the first proportion at an environment temperature of ISA −69° C. is in the range of from 1.5 to 4.5, preferably in the range of from 2.0 to 4.0, more preferably in the range of from 2.0 to 3.5.

The method may comprise operating the heat management system to provide the first amount of heat and the second amount of heat such that a ratio of the first proportion at an environment temperature of ISA +40° C. to the first proportion at an environment temperature of ISA +10° C. is in the range of from 1.20 to 1.42, preferably in the range of from 1.22 to 1.41, more preferably in the range of from 1.25 to 1.40.

The method may comprise operating the heat management system to provide the first amount of heat and the second amount of heat such that a second proportion of heat generated by the gearbox and the turbomachinery and dissipated to air defined as $$\left(\frac{\text{first amount of heat 111}}{\text{first amount of heat 111} + \text{second amount of heat 112}}\right)_{65\% \, MTO}$$

at 65% of the core shaft maximum take-off speed is in the range of from 0.60 to 1, preferably in the range of from 0.70 to 1, more preferably in the range of from 0.75 to 1.

The method may comprise operating the heat management system to provide the first amount of heat and the second amount of heat such that a ratio of the second proportion at an environment temperature of ISA +40° C. to the second proportion at an environment temperature of ISA −69° C. is in the range of from 1.1 to 2.1, preferably in the range of from 1.2 to 2.1, more preferably in the range of from 1.4 to 2.0.

The method may comprise operating the heat management system to provide the first amount of heat and the second amount of heat such that a ratio of the second proportion at an environment temperature of ISA +40° C. to the second proportion at an environment temperature of ISA +10° C. is in the range of from 1.10 to 1.25, preferably in the range of from 1.10 to 1.22, more preferably in the range of from 1.11 to 1.20.

The method may comprise operating the heat management system to provide at an environment temperature of ISA −69° C. the first amount of heat and the second amount of heat such that a ratio of the first proportion to the second proportion in the range of from 0.30 to 0.55, preferably in the range of from 0.35 to 0.45.

The method may comprise operating the heat management system to provide at an environment temperature of ISA +10° C. the first amount of heat and the second amount of heat such that a ratio of the first proportion to the second proportion is in the range of from 0.45 to 0.65, preferably in the range of from 0.45 to 0.60, more preferably in the range of from 0.47 to 0.58.

The method may comprise operating the heat management system to provide at an environment temperature of ISA +10° C. the first amount of heat and the second amount of heat such that the second proportion is in the range of from 0.60 to 0.95.

The method may comprise operating the heat management system to provide at an environment temperature of ISA −69° C. the first amount of heat and the second amount of heat such that the second proportion is in the range of from 0.40 to 0.75.

The method may comprise operating the heat management system to provide the first amount of heat and the second amount of heat such that a proportion of heat generated by the gearbox and the turbomachinery and dissipated to air is greater than A·NH+B, and less than the lower of 1 and C·NH+D, wherein A is equal to −1.15, B is equal to, or greater than, 1.48, C is equal to −1.84, D is in the range of from 2.10 to 2.30, preferably in the range of from 2.18 to 2.30, more preferably in the range of from 2.18 to 2.25, even more preferably in the range of from 2.20 to 2.25; and NH is the core shaft speed expressed as proportion of the core shaft maximum take-off speed and is in the range of from 0.65 to 1.

B may be equal to, or greater than, 1.5, or 1.52, or 1.54, or 1.56.

The method may comprise operating the heat management system to provide the first amount of heat and the second amount of heat such that a proportion of heat generated by the gearbox and the turbomachinery and dissipated to air is
greater than A·NH+B, and less than the lower of 1 and E·(NH−1)+F,
wherein A is equal to −1.15, B is equal to, or greater than, 1.48, E is in the range of from −1.16 to −3, preferably in the range of from −1.16 to −2.5, more preferably in the range of from −1.16 to −1.95; F is equal to, or greater than, 0.37, and NH is the core shaft speed expressed as proportion of the core shaft maximum take-off speed and is in the range of from 0.65 to 1.

B may be equal to, or greater than, 1.5, or 1.52, or 1.54, or 1.56.

NH may be in the range of from 0.65 to 0.85.

The heat management system may include a flow restriction valve arranged downstream of the air-lubricant heat exchanger, and the method may include operating the flow restriction valve to vary a mass flow rate of the cooling air across the air-lubricant heat exchanger, thereby varying the first amount of heat.

According to an aspect there is provided a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger adapted to receive cooling air from the bypass duct to dissipate a first amount of heat to a first heat sink, and at least one fuel-lubricant heat exchanger to dissipate a second amount of heat to a second heat sink; wherein the first heat sink is bypass air and the second heat sink is fuel, wherein the heat management system is configured to provide the first amount of heat and the second amount of heat such that a first proportion of heat generated by the gearbox and the turbomachinery and dissipated to air defined as $$\left(\frac{\text{first amount of heat 111}}{\text{first amount of heat 111} + \text{second amount of heat 112}}\right)85\% \; MTO$$

at 85% of a core shaft maximum take-off speed is in the range of from 0.25 to 0.70; and wherein the fan is configured to provide at cruise condition a fan pressure ratio in the range of from 1.35 to 1.43.

The heat management system may be configured to provide at an environment temperature of ISA +40° C. the first amount of heat and the second amount of heat such that the first proportion is in the range of from 0.55 to 0.70, preferably in the range of from 0.60 to 0.70

The heat management system may be configured to provide at an environment temperature of ISA +10° C. the first amount of heat and the second amount of heat such that the first proportion is in the range of from 0.35 to 0.65, preferably in the range of from 0.40 to 0.60, more preferably in the range of from 0.45 to 0.55.

The heat management system may be configured to provide the first amount of heat and the second amount of heat such that a ratio of the first proportion at an environment temperature of ISA +40° C. to the first proportion at an environment temperature of ISA +10° C. is in the range of from 1.20 to 1.42, preferably in the range of from 1.22 to 1.41, more preferably in the range of from 1.25 to 1.40.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel, wherein the heat management system is configured to provide the first amount of heat and the second amount of heat such that a proportion of heat generated by the gearbox and the turbomachinery and dissipated to air at 65% of a core shaft maximum take-off (MTO) speed defined as $$\left(\frac{\text{first amount of heat 111}}{\text{first amount of heat 111} + \text{second amount of heat 112}}\right)65\% \; MTO$$

is in the range of from 0.6 to 1, and wherein the fan is configured to have a fan rotational speed at MTO conditions in the range of from 1500 rpm to 2800 rpm.

As used herein, proportions correspond to percentages, and vice versa, and therefore, for example, a proportion of 0.5 correspond to 50% and a proportion of 1 correspond to 100%.

In other words, at 65% of the core shaft maximum take-off speed from 60% to 100% of the heat generated by the power gearbox and the turbomachinery is dissipated to the first heat sink (the remainder of the heat generated by the power gearbox and the turbomachinery being dissipated to the second heat sink).

The present inventor has understood that providing a heat management system configured to provide specific proportions of heat dissipated to air at 65% of the core shaft maximum take-off speed, i.e. at a speed at, or close to, flight idle, and a fan configured to have a fan rotational speed at MTO conditions in a specific range allows to provide adequate lubrication and cooling to the power gearbox and the turbomachinery bearings, minimise the size and therefore the weight of the heat exchangers, maximise SFC benefits and at the same time avoid fuel thermal degradation when fuel flow is minimal.

The fan may be configured to have a fan rotational speed at MTO conditions in the range of from 1600 rpm to 2500 rpm, preferably in the range of from 1600 rpm to 2200 rpm, more preferably in the range of from 1700 rpm to 1900rpm.

The heat management system may be configured to provide the first amount of heat and the second amount of heat such that the proportion of heat generated by the gearbox and the turbomachinery and dissipated to air at 65% of the core shaft maximum take-off (MTO) speed is in the range of from 0.70 to 1, preferably in the range of from 0.75 to 1.

The heat management system may be configured to provide at an environment temperature of ISA +40° C. the first amount of heat and the second amount of heat such that the proportion of heat generated by the gearbox and the turbomachinery and dissipated to air at 65% of the core shaft maximum take-off (MTO) speed in the range of from 0.85 to 1, preferably in the range of from 0.90 to 1.

The heat management system may be configured to provide at an environment temperature of ISA +10° C. the first amount of heat and the second amount of heat such that the proportion of heat generated by the gearbox and the turbomachinery and dissipated to air at 65% of the core shaft maximum take-off (MTO) speed in the range of from 0.80 to 0.92.

The heat management system may be configured to provide the first amount of heat and the second amount of heat such that a ratio of the proportion of heat generated by the gearbox and the turbomachinery and dissipated to air at 65% of the core shaft maximum take-off (MTO) speed at an environment temperature of ISA +40° C. to the proportion of heat generated by the gearbox and the turbomachinery and dissipated to air at 65% of the core shaft maximum take-off (MTO) speed at an environment temperature of ISA −69° C. is in the range of from 1.1 to 2.1, preferably in the range of from 1.2 to 2.1, more preferably in the range of from 1.4 to 2.0.

The heat management system may be configured to provide the first amount of heat and the second amount of heat such that a ratio of the proportion of heat generated by the gearbox and the turbomachinery and dissipated to air at 65% of the core shaft maximum take-off (MTO) speed at an environment temperature of ISA +40° C. to the proportion of heat generated by the gearbox and the turbomachinery and dissipated to air at 65% of the core shaft maximum take-off (MTO) speed at an environment temperature of ISA +10° C. is in the range of from 1.10 to 1.25, preferably in the range of from 1.10 to 1.22, more preferably in the range of from 1.11 to 1.20.

The heat management system may be configured to provide the first amount of heat and the second amount of heat such that a proportion of heat generated by the gearbox and the turbomachinery and dissipated to air at 85% of the core shaft maximum take-off (MTO) speed defined as $$\left(\frac{\text{first amount of heat 111}}{\text{first amount of heat 111} + \text{second amount of heat 112}}\right)_{85\% \, MTO}$$

is in the range of from 0.25 to 0.70, preferably in the range of from 0.35 to 0.70, more preferably in the range of from 0.45 to 0.70, even more preferably in the range of from 0.50 to 0.70.

The heat management system may be configured to provide at an environment temperature of ISA +40° C. the first amount of heat and the second amount of heat such that the proportion of heat generated by the gearbox and the turbomachinery and dissipated to air at 85% of the core shaft maximum take-off (MTO) speed is in the range of from 0.55 to 0.70, preferably in the range of from 0.60 to 0.70.

The heat management system may be configured to provide at an environment temperature of ISA +10° C. the first amount of heat and the second amount of heat such that the proportion of heat generated by the gearbox and the turbomachinery and dissipated to air at 85% of the core shaft maximum take-off (MTO) speed is in the range of from 0.40 to 0.60, preferably in the range of from 0.45 to 0.55.

The heat management system may be configured to provide the first amount of heat and the second amount of heat such that a ratio of the proportion of heat generated by the gearbox and the turbomachinery and dissipated to air at 85% of the core shaft maximum take-off (MTO) speed at an environment temperature of ISA +40° C. to the proportion of heat generated by the gearbox and the turbomachinery and dissipated to air at 85% of the core shaft maximum take-off (MTO) speed at an environment temperature of ISA +10° C. is in the range of from 1.20 to 1.42, preferably in the range of from 1.22 to 1.41, more preferably in the range of from 1.25 to 1.40.

The heat management system may be configured to provide at an environment temperature of ISA +10° C. the first amount of heat and the second amount of heat such that a ratio of the proportion of heat generated by the gearbox and the turbomachinery and dissipated to air at 85% of the core shaft maximum take-off (MTO) speed to the proportion of heat generated by the gearbox and the turbomachinery and dissipated to air at 65% of the core shaft maximum take-off (MTO) speed is in the range of from 0.45 to 0.65, preferably in the range of from 0.45 to 0.60, more preferably in the range of from 0.47 to 0.58.

The heat management system may be configured to provide the first amount of heat and the second amount of heat such that a proportion of heat generated by the gearbox and the turbomachinery and dissipated to air is greater than A·NH+B, and less than the lower of 1 and C·NH+D, wherein A is equal to −1.15, B is equal to, or greater than, 1.48, C is equal to −1.84, D is in the range of from 2.10 to 2.30, preferably in the range of from 2.18 to 2.30, more preferably in the range of from 2.18 to 2.25, even more preferably in the range of from 2.20 to 2.25; and NH is the core shaft speed expressed as proportion of the core shaft maximum take-off speed and is in the range of from 0.65 to 1. B may be equal to, or greater than, 1.5, or 1.52, or 1.54, or 1.56.

NH may be in the range of from 0.65 to 0.85.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The first lubricant circuit may provide lubrication and cooling to the power gearbox.

The second lubricant circuit may provide lubrication and cooling to the turbomachinery bearings.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core, the fan being configured to have a fan rotational speed at MTO conditions in the range of from 1.500 rpm to 2.800 rpm; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; wherein a proportion of heat generated by the gearbox and the turbomachinery and dissipated to air at 65% of a core shaft maximum take-off (MTO) speed is defined as $$\left(\frac{\text{first amount of heat 111}}{\text{first amount of heat 111} + \text{second amount of heat 112}}\right)_{65\% \, MTO}$$

wherein the method comprises the step of operating the heat management system to provide the proportion of heat generated by the gearbox and the turbomachinery and dissipated to air at 65% of the core shaft maximum take-off (MTO) speed in the range of from 0.6 to 1.

The method may comprise the step of operating the heat management system to provide at an environment temperature of ISA +40° C. the first amount of heat and the second amount of heat such that the proportion of heat generated by the gearbox and the turbomachinery and dissipated to air at 65% of the core shaft maximum take-off (MTO) speed is in the range of from 0.85 to 1, preferably in the range of from 0.90 to 1

The method may comprise the step of operating the heat management system to provide at an environment temperature of ISA +10° C. the first amount of heat and the second amount of heat such that the proportion of heat generated by the gearbox and the turbomachinery and dissipated to air at 65% of the core shaft maximum take-off (MTO) speed in the range of from 0.80 to 0.92

The method may comprise the step of operating the heat management system to provide the first amount of heat and the second amount of heat such that a ratio of the proportion of heat generated by the gearbox and the turbomachinery and dissipated to air at 65% of the core shaft maximum take-off (MTO) speed at an environment temperature of ISA +40° C. to the proportion of heat generated by the gearbox and the turbomachinery and dissipated to air at 65% of the core shaft maximum take-off (MTO) speed at an environment temperature of ISA −69° C. is in the range of from 1.1 to 2.1, preferably in the range of from 1.2 to 2.1, more preferably in the range of from 1.4 to 2.0.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel, wherein the heat management system is configured to provide at an environment temperature of ISA +40° C. the first amount of heat and the second amount of heat such that:

a first proportion of the heat generated by the gearbox and the turbomachinery and dissipated to air defined as $$\left(\frac{\text{first amount of heat 111}}{\text{first amount of heat 111 + second amount of heat 112}}\right)_{85\% \; MTO}$$

at 85% of a core shaft maximum take-off speed is in the range of from 0.55 to 0.70; and a second proportion of heat generated by the gearbox and the turbomachinery and dissipated to air defined as $$\left(\frac{\text{first amount of heat 111}}{\text{first amount of heat 111 + second amount of heat 112}}\right)_{65\% \; MTO}$$

at 65% of the core shaft maximum take-off (MTO) speed is in the range of from 0.85 to 1.

As used herein, proportions correspond to percentages, and vice versa, and therefore, for example, a proportion of 0.5 correspond to 50% and a proportion of 1 correspond to 100%.

In other words, at 85% of a core shaft maximum take-off speed and at an environment temperature of ISA +40° C. from 55% to 70% of the heat generated by the power gearbox and the turbomachinery is dissipated to the first heat sink (the remainder of the heat generated by the power gearbox and the turbomachinery being dissipated to the second heat sink), and at 65% of the core shaft maximum take-off speed and at an environment temperature of ISA +40° C. from 85% to 100% of the heat generated by the power gearbox and the turbomachinery is dissipated to the first heat sink (the remainder of the heat generated by the power gearbox and the turbomachinery being dissipated to the second heat sink).

The present inventor has understood that providing a heat management system configured to provide, at the highest temperature an engine is certified for, specific proportions of heat dissipated to air at 65% of the core shaft maximum take-off speed, i.e. at a speed at, or close to, flight idle, and at 85% of the core shaft maximum take-off speed, i.e. at a speed at, or close to, cruise conditions, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

The first proportion of heat generated by the gearbox and the turbomachinery and dissipated to air at 85% of a core shaft maximum take-off speed at an environment temperature of ISA +40° C. may be in the range of from 0.60 to 0.70, preferably in the range of from 0.62 to 0.68.

The second proportion of heat generated by the gearbox and the turbomachinery and dissipated to air at 65% of the core shaft maximum take-off (MTO) speed at an environment temperature of ISA +40° C. may be in the range of from 0.90 to 1, preferably in the range of from 0.92 to 1.

The heat management system may be configured to provide at an environment temperature of ISA +10° C. the first amount of heat and the second amount of heat such that the first proportion of heat generated by the gearbox and the turbomachinery and dissipated to air at 85% of the core shaft maximum take-off (MTO) speed is in the range of from 0.40 to 0.60, preferably in the range of from 0.45 to 0.55.

The heat management system may be configured to provide at an environment temperature of ISA +10° C. the first amount of heat and the second amount of heat such that the second proportion of heat generated by the gearbox and the turbomachinery and dissipated to air at 65% of the core shaft maximum take-off (MTO) speed is in the range of from 0.80 to 0.92.

The heat management system may be configured to provide the first amount of heat and the second amount of heat such that a ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of a core shaft maximum take-off speed at an environment temperature of ISA +10° C. is in the range of from 1.20 to 1.42, preferably in the range of from 1.22 to 1.41, more preferably in the range of from 1.25 to 1.40.

The heat management system may be configured to provide the first amount of heat and the second amount of heat such that a ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of a core shaft maximum take-off speed at an environment temperature of ISA -69° C. is in the range of from 1.5 to 4.5, preferably in the range of from 2.0 to 4.0, more preferably in the range of from 2.0 to 3.5.

The heat management system may be configured to provide the first amount of heat and the second amount of heat such that a ratio of the second proportion of the heat generated by the gearbox and the turbomachinery and dissipated to air at 65% of the core shaft maximum take-off speed at an environment temperature of ISA +40° C. to the second proportion of the heat generated by the gearbox and the turbomachinery and dissipated to air at 65% of the core shaft maximum take-off speed at an environment temperature of ISA +10° C. is in the range of from 1.10 to 1.25, preferably in the range of from 1.10 to 1.22, more preferably in the range of from 1.11 to 1.20.

The heat management system may be configured to provide the first amount of heat and the second amount of heat such that a ratio of the second proportion of the heat generated by the gearbox and the turbomachinery and dissipated to air at 65% of the core shaft maximum take-off speed at an environment temperature of ISA +40° C. to the second proportion of the heat generated by the gearbox and the turbomachinery and dissipated to air at 65% of the core shaft maximum take-off speed at an environment temperature of ISA −69° C. is in the range of from 1.1 to 2.1, preferably in the range of from 1.2 to 2.1, more preferably in the range of from 1.4 to 2.0.

The heat management system may be configured to provide at an environment temperature of ISA +10° C. the first amount of heat and the second amount of heat such that a ratio of the first proportion to the second proportion is in the range of from 0.45 to 0.65, preferably in the range of from 0.45 to 0.60, more preferably in the range of from 0.47 to 0.58.

The heat management system may be configured to provide at an environment temperature of ISA −69° C. a ratio of the first proportion of the heat generated by the gearbox and the turbomachinery and dissipated to air at 85% of the core shaft maximum take-off speed to the second proportion of the heat generated by the gearbox and the turbomachinery and dissipated to air at 65% of the core shaft maximum take-off speed in the range of from 0.30 to 0.55, preferably in the range of from 0.35 to 0.45.

The combustor may be a lean burn combustor.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The heat management system may include a modulation device adapted to adjust a lubricant flow distribution between the power gearbox and the turbomachinery bearings.

The fan may have a fan diameter in the range of from 210 cm to 380 cm.

The power gearbox may have a gear ratio in the range of from 2.9 to 4.0, or from 3.0 to 3.8.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and - a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel;

wherein a first proportion of the heat generated by the gearbox and the turbomachinery and dissipated to air is defined as $$\left(\frac{\text{first amount of heat 111}}{\text{first amount of heat 111 + second amount of heat 112}}\right)85\%\ MTO$$

at 85% of a core shaft maximum take-off speed; and a second proportion of heat generated by the gearbox and the turbomachinery and dissipated to air is defined as $$\left(\frac{\text{first amount of heat 111}}{\text{first amount of heat 111 + second amount of heat 112}}\right)65\%\ MTO$$

at 65% of the core shaft maximum take-off (MTO) speed.
wherein the method comprises the step of operating the heat management system to provide the first amount of heat and the second amount of heat such that at an environment temperature of ISA +40° C. the first proportion is in the range of from 0.55 to 0.70, and the second proportion is in the range of from 0.85 to 1.

At an environment temperature of ISA +40° C. the first proportion may be in the range of from 0.60 to 0.70, preferably in the range of from 0.62 to 0.68.

At an environment temperature of ISA +40° C. the second proportion may be in the range of from 0.90 to 1, preferably in the range of from 0.92 to 1.

The method may comprise the step of operating the heat management system to provide the first amount of heat and the second amount of heat such that a ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of a core shaft maximum take-off speed at an environment temperature of ISA +10° C. is in the range of from 1.20 to 1.42, preferably in the range of from 1.22 to 1.41, more preferably in the range of from 1.25 to 1.40.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; wherein a first proportion of the heat generated by the gearbox and the turbomachinery and dissipated to air is defined as $$\left(\frac{\text{first amount of heat 111}}{\text{first amount of heat 111} + \text{second amount of heat 112}}\right)_{85\% \text{ MTO}}$$

at 85% of a core shaft maximum take-off speed,
wherein a second proportion of the heat generated by the gearbox and the turbomachinery and dissipated to air is defined as $$\left(\frac{\text{first amount of heat 111}}{\text{first amount of heat 111} + \text{second amount of heat 112}}\right)_{65\% \text{ MTO}}$$

at 65% of the core shaft maximum take-off speed; and
wherein the heat management system is configured to provide a ratio of the first proportion to the second proportion in the range of from 0.30 to 0.55, preferably in the range of from 0.35 to 0.45, at an environment temperature of ISA −69° C.

As used herein, proportions correspond to percentages, and vice versa, and therefore, for example, a proportion of 0.5 correspond to 50% and a proportion of 1 correspond to 100%.

The present inventor has understood that providing a heat management system configured to provide, at the coldest temperature an engine is certified, specific proportions of heat dissipated to air at 65% of the core shaft maximum take-off speed, i.e. at a speed at, or close to, flight idle, and at 85% of the core shaft maximum take-off speed, i.e. at a speed at, or close to, cruise conditions, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

The first proportion of the heat generated by the gearbox and the turbomachinery and dissipated to air at 85% of the core shaft maximum take-off speed at an environment temperature of ISA −69° C. may be in the range of from 0.20 to 0.40.

The first proportion of the heat generated by the gearbox and the turbomachinery and dissipated to air at 85% of the core shaft maximum take-off speed at an environment temperature of ISA −69° C. may be in the range of from 0.20 to 0.35, preferably in the range of from 0.20 to 0.30.

The second proportion of the heat generated by the gearbox and the turbomachinery and dissipated to air at 65% of the core shaft maximum take-off speed at an environment temperature of ISA −69° C. may be in the range of from 0.50 to 0.70.

The second proportion of the heat generated by the gearbox and the turbomachinery and dissipated to air at 65% of the core shaft maximum take-off speed at an environment temperature of ISA −69° C. may be in the range of from 0.55 to 0.70, preferably in the range of from 0.55 to 0.67.

The heat management system may be configured to provide the first amount of heat and the second amount of heat such that a ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of the core shaft maximum take-off speed at an environment temperature of ISA −69° C. is in the range of from 1.5 to 4.5.

The ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of the core shaft maximum take-off speed at an environment temperature of ISA −69° C. may be in the range of from 2.0 to 4.0, preferably in the range of from 2.0 to 3.5.

The heat management system may be configured to provide the second proportion of the heat generated by the gearbox and the turbomachinery and dissipated to air at 65% of the core shaft maximum take-off speed at an environment temperature of ISA +40° C. to the second proportion of the heat generated by the gearbox and the turbomachinery and dissipated to air at 65% of the core shaft maximum take-off speed at an environment temperature of ISA −69° C. is in the range of from 1.1 to 2.1.

The heat management system may be configured to provide the second proportion of the heat generated by the gearbox and the turbomachinery and dissipated to air at 65% of the core shaft maximum take-off speed at an environment temperature of ISA +40° C. to the second proportion of the heat generated by the gearbox and the turbomachinery and dissipated to air at 65% of the core shaft maximum take-off speed at an environment temperature of ISA −69° C. is in the range of from 1.2 to 2.1, preferably in the range of from 1.4 to 2.0.

The heat management system may be configured to provide at an environment temperature of ISA +40° C. the first amount of heat and the second amount of heat such that the first proportion of heat generated by the gearbox and the turbomachinery and dissipated to air at 85% of the core shaft maximum take-off speed is in the range of from 0.55 to 0.75, preferably in the range of from 0.55 to 0.70, more preferably in the range of from 0.60 to 0.70.

The heat management system may be configured to provide at an environment temperature of ISA +40° C. the first amount of heat and the second amount of heat such that the second proportion of heat generated by the gearbox and the turbomachinery and dissipated to air at 65% of the core shaft maximum take-off speed is in the range of from 0.85 to 1, preferably in the range of from 0.90 to 1.

The heat management system may be configured to provide the first amount of heat and the second amount of heat such that a proportion of the heat generated by the gearbox and the turbomachinery and dissipated to air is
greater than A·NH+B, and less than the lower of 1 and C·NH+D,
wherein A is equal to −1.15, B is equal to, or greater than, 1.48, C is equal to −1.84, D is in the range of from 2.10 to 2.30, and NH is the core shaft speed expressed as proportion of the core shaft maximum take-off speed and is in the range of from 0.65 to 1, preferably in the range of from 0.65 to 0.85.

B may be equal to, or greater than, 1.5, or 1.52, or 1.54, or 1.56.

D may be in the range of from 2.18 to 2.30, preferably in the range of from 2.18 to 2.25, even more preferably in the range of from 2.20 to 2.25.

The core shaft maximum take-off speed may be in the range of from 5500 rpm to 9500 rpm, preferably in the range of from 5500 rpm to 8500 rpm, preferably in the range of from 5500 rpm to 7500 rpm.

The combustor may be a lean burn combustor.

The power gearbox may have a gear ratio in the range of from 2.9 to 4.0, or from 3.0 to 3.8.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core, the fan being configured to have a fan rotational speed at MTO conditions in the range of from 1500 rpm to 2800 rpm; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel;

wherein a first proportion of the heat generated by the gearbox and the turbomachinery and dissipated to air is defined as $$\left(\frac{\text{first amount of heat 111}}{\text{first amount of heat 111} + \text{second amount of heat 112}}\right)_{85\% \, MTO}$$

at 85% of a core shaft maximum take-off speed, and a second proportion of the heat generated by the gearbox and the turbomachinery and dissipated to air is defined as $$\left(\frac{\text{first amount of heat 111}}{\text{first amount of heat 111} + \text{second amount of heat 112}}\right)_{65\% \, MTO}$$

at 65% of the core shaft maximum take-off speed, wherein the method comprises the step of operating the heat management system to provide the first amount of heat and the second amount of heat such that at an environment temperature of ISA −69° C. a ratio of the first proportion to the second proportion is in the range of from 0.30 to 0.55, preferably in the range of from 0.35 to 0.45.

The method may comprise the step of operating the heat management system to provide the first amount of heat and the second amount of heat such that at an environment temperature of ISA −69° C. the first proportion of the heat generated by the gearbox and the turbomachinery and dissipated to air at 85% of the core shaft maximum take-off speed is in the range of from 0.20 to 0.40, preferably in the range of from 0.20 to 0.35, more preferably in the range of from 0.20 to 0.30.

The method may comprise the step of operating the heat management system to provide the first amount of heat and the second amount of heat such that at an environment temperature of ISA −69° C. the second proportion of the heat generated by the gearbox and the turbomachinery and dissipated to air at 65% of the core shaft maximum take-off speed is in the range of from 0.50 to 0.70, preferably in the range of from 0.55 to 0.70, more preferably in the range of from 0.55 to 0.67.

The method may comprise the step of operating the heat management system to provide the first amount of heat and the second amount of heat such that a ratio of the first proportion of the heat generated by the gearbox and the turbomachinery and dissipated to air at 85% of the core shaft maximum take-off speed at an environment temperature of ISA +40° C. to the first proportion of the heat generated by the gearbox and the turbomachinery and dissipated to air at 85% of the core shaft maximum take-off speed at an environment temperature of ISA −69° C. is in the range of from 1.5 to 4.5, preferably in the range of from 2.0 to 4.0, more preferably in the range of from 2.0 to 3.5.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; wherein a first proportion of heat generated by the gearbox and the turbomachinery and dissipated to air is defined as $$\left(\frac{\text{first amount of heat 111}}{\text{first amount of heat 111} + \text{second amount of heat 112}}\right)_{85\% \, MTO}$$

at 85% of a core shaft maximum take-off speed; wherein a second proportion of heat generated by the gearbox and the turbomachinery and dissipated to air is defined as $$\left(\frac{\text{first amount of heat 111}}{\text{first amount of heat 111} + \text{second amount of heat 112}}\right)_{65\% \, MTO}$$

at 65% of the core shaft maximum take-off speed; and wherein the heat management system is configured to provide the first amount of heat and the second amount of heat such that a ratio of the first proportion at an environment temperature of ISA +40° C. to the first proportion at an environment temperature of ISA −69° C. is in the range of from 1.5 to 4.5, and a ratio of the second proportion at an environment temperature of ISA +40° C. to the second proportion at an environment temperature of ISA −69° C. is in the range of from 1.1 to 2.1.

As used herein, proportions correspond to percentages, and vice versa, and therefore, for example, a proportion of 0.5 correspond to 50% and a proportion of 1 correspond to 100%.

The present inventor has understood that providing a heat management system configured to provide, at the highest and lowest environment temperatures an engine is certified for, specific proportions of heat dissipated to air at 65% of the core shaft maximum take-off speed, i.e. at a speed at, or close to, flight idle, and at 85% of the core shaft maximum take-off speed, i.e. at a speed at, or close to, cruise conditions, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

The ratio of the first proportion at an environment temperature of ISA +40° C. to the first proportion at an environment temperature of ISA −69° C. may be in the range of from 2.0 to 4.0, preferably in the range of from 2.0 to 3.5.

The ratio of the second proportion at an environment temperature of ISA +40° C. to the second proportion at an environment temperature of ISA −69° C. may be in the range of from 1.2 to 2.1, preferably in the range of from 1.4 to 2.0.

The heat management system may be configured to provide the first amount of heat and the second amount of heat such that the first proportion at an environment temperature of ISA +40° C. is in the range of from 0.55 to 0.70, preferably in the range of from 0.60 to 0.70.

The heat management system may be configured to provide the first amount of heat and the second amount of heat such that the first proportion at an environment temperature of ISA −69° C. is in the range of from 0.20 to 0.40, preferably in the range of from 0.20 to 0.35.

The heat management system may be configured to provide the first amount of heat and the second amount of heat such that the second proportion at an environment temperature of ISA +40° C. in in the range of from 0.85 to 1, preferably in the range of from 0.90 to 1.

The heat management system may be configured to provide the first amount of heat and the second amount of heat such that the second proportion at an environment temperature of ISA −69° C. is in the range of from 0.50 to 0.70, preferably in the range of from 0.55 to 0.70, more preferably in the range of from 0.55 to 0.67.

The heat management system may be configured to provide at an environment temperature of ISA +10° C. the first amount of heat and the second amount of heat such that the first proportion is in the range of from 0.40 to 0.60, preferably in the range of from 0.45 to 0.55.

The heat management system may be configured to provide at an environment temperature of ISA +10° C. the first amount of heat and the second amount of heat such that the second proportion is in the range of from 0.80 to 0.92.

The heat management system may be configured to provide the first amount of heat and the second amount of heat such that a ratio of the first proportion at an environment temperature of ISA +40° C. to the first proportion at an environment temperature of ISA +10° C. is in the range of from 1.20 to 1.42.

The ratio of the first proportion at an environment temperature of ISA +40° C. to the first proportion at an environment temperature of ISA +10° C. may be in the range of from 1.22 to 1.41, preferably in the range of from 1.25 to 1.40.

The ratio of the second proportion at an environment temperature of ISA +40° C. to the second proportion at an environment temperature of ISA +10° C. may be in the range of from 1.10 to 1.25.

The ratio of the second proportion at an environment temperature of ISA +40° C. to the second proportion at an environment temperature of ISA +10° C. may be in the range of from 1.10 to 1.22, preferably in the range of from 1.11 to 1.20.

The heat management system may include a modulation device adapted to adjust a lubricant flow distribution between the power gearbox and the turbomachinery bearings.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The heat management system may comprise a lubricant tank in fluid communication with, and feeding lubricant to, the first and second lubricant circuits.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the first heat sink is air and the second heat sink is fuel; wherein a first proportion of heat generated by the gearbox and the turbomachinery and dissipated to air is defined as $$\left(\frac{\text{first amount of heat 111}}{\text{first amount of heat 111} + \text{second amount of heat 112}}\right)_{85\% \, MTO}$$

at 85% of a core shaft maximum take-off speed; wherein a second proportion of heat generated by the gearbox and the turbomachinery and dissipated to air is defined as $$\left(\frac{\text{first amount of heat 111}}{\text{first amount of heat 111} + \text{second amount of heat 112}}\right)_{65\% \, MTO}$$

at 65% of the core shaft maximum take-off speed; and wherein the method comprises the step of operating the heat management system to provide the first amount of heat and the second amount of heat such that a ratio of the first proportion at an environment temperature of ISA +40° C. to the first proportion at an environment temperature of ISA -69° C. is in the range of from 1.5 to 4.5, preferably in the range of from 2.0 to 4.0, more preferably in the range of from 2.0 to 3.5 and a ratio of the second proportion at an environment temperature of ISA +40° C. to the second proportion at an environment temperature of ISA −69° C. is in the range of from 1.1 to 2.1, preferably in the range of from 1.2 to 2.1, more preferably in the range of from 1.4 to 2.0.

The method may comprise the step of operating the heat management system to provide the first amount of heat and the second amount of heat such that the first proportion at an environment temperature of ISA +40° C. is in the range of from 0.55 to 0.70, preferably in the range of from 0.60 to 0.70.

The method may comprise the step of operating the heat management system to provide the first amount of heat and the second amount of heat such that the first proportion at an environment temperature of ISA −69° C. is in the range of from 0.20 to 0.40, preferably in the range of from 0.20 to 0.35.

The method may comprise the step of operating the heat management system to provide the first amount of heat and the second amount of heat such that the second proportion at an environment temperature of ISA +40° C. in in the range of from 0.85 to 1, preferably in the range of from 0.90 to 1, and/or the second proportion at an environment temperature of ISA −69° C. is in the range of from 0.50 to 0.70, preferably in the range of from 0.55 to 0.70, more preferably in the range of from 0.55 to 0.67.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel; wherein the heat management system is configured to provide the first amount of heat and the second amount of heat such that a proportion of heat generated by the gearbox and the turbomachinery and dissipated to air is
greater than $A \cdot NH+B$ and less than 1,
wherein A is equal to −1.15, B is equal to, or greater than, 1.48, and NH is the core shaft speed expressed as proportion of the core shaft maximum take-off speed and is in the range of from 0.65 to 1, preferably in the range of from 0.65 to 0.90.

As used herein, proportions correspond to percentages, and vice versa, and therefore, for example, a proportion of 0.5 correspond to 50% and a proportion of 1 correspond to 100%.

In other words, when NH is 0.65 the core shaft speed is 65% of the core shaft maximum take-off speed, and when NH is 1 the core shaft speed is 100% of, or equal to, the core shaft The present inventor has understood that providing a heat management system configured to provide specific proportions of heat dissipated to air in the range of from 65% to 100% of the core shaft maximum take-off speed, i.e. substantially over the whole engine operational range, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

B may be equal to, or greater than, 1.5, or 1.52, or 1.54, or 1.56.

The heat management system may be configured to provide the first amount of heat and the second amount of heat such that the proportion of heat generated by the gearbox and the turbomachinery and dissipated to air is
less than the lower of 1 and $C \cdot NH+D$,
wherein C is equal to −1.84, D is in the range of from 2.10 to 2.30, and NH is in the range of from 0.65 to 1, preferably in the range of from 0.65 to 0.90.

D may be in the range of from 2.18 to 2.30, preferably in the range of from 2.18 to 2.25, even more preferably in the range of from 2.20 to 2.25.

The combustor may be a lean burn combustor. The lean burn combustor may comprise a plurality of lean burn fuel spray nozzles, each fuel spray nozzle comprising a pilot fuel injector and a main fuel injector.

NH may be in the range of from 0.65 to 0.85, preferably in the range of from 0.65 to 0.80, more preferably in the range of from 0.65 to 0.75.

The heat management system may be configured to provide the first amount of heat and the second amount of heat such that a first proportion of heat generated by the gearbox and the turbomachinery and dissipated to air at 85% of the core shaft maximum take-off speed is in the range of from 0.50 to 0.70, preferably in the range of from 0.50 to 0.65.

The heat management system may be configured to provide the first amount of heat and the second amount of heat such that a second proportion of heat generated by the gearbox and the turbomachinery and dissipated to air at 65% of the core shaft maximum take-off speed is in the range of from 0.75 to 1, preferably in the range of from 0.80 to 1.

The heat management system may be configured to provide the first amount of heat and the second amount of heat such that at an environment temperature of ISA +40° C. a first proportion of heat generated by the gearbox and the turbomachinery and dissipated to air at 85% of the core shaft maximum take-off speed is in the range of from 0.55 to 0.70, preferably in the range of from 0.60 to 0.70.

The heat management system may be configured to provide the first amount of heat and the second amount of heat such that at an environment temperature of ISA +40° C. a second proportion of heat generated by the gearbox and the turbomachinery and dissipated to air at 65% of the core shaft maximum take-off speed is in the range of from 0.92 to 1.

The heat management system may be configured to provide the first amount of heat and the second amount of heat such that at an environment temperature of ISA +10° C. a second proportion of heat generated by the gearbox and the turbomachinery and dissipated to air at 65% of the core shaft maximum take-off speed is in the range of from 0.80 to 0.92.

The heat management system may be configured to provide the first amount of heat and the second amount of heat such that a ratio of a second proportion of heat generated by the gearbox and the turbomachinery and dissipated to air at 65% of the core shaft maximum take-off speed at an environment temperature of ISA +40° C. to the second proportion of heat generated by the gearbox and the turbomachinery and dissipated to air at 65% of the core shaft maximum take-off speed at an environment temperature of ISA +10° C. is in the range of from 1.10 to 1.25, preferably in the range of from 1.10 to 1.22, more preferably in the range of from 1.11 to 1.20.

The air of the first heat sink may be bypass air.

A flow restriction valve may be arranged downstream of the at least one air-lubricant heat exchanger to vary a mass flow rate of cooling air across the at least one air-lubricant heat exchanger, thereby varying the first amount of heat.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The fan may have a fan diameter in the range of from 210 cm to 380 cm, or from 220 cm to 360 cm.

The power gearbox may have a gear ratio in the range of from 2.9 to 4.0, or from 3.0 to 3.8.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink; wherein the method comprises the step of operating the heat management system to provide the first amount of heat and the second amount of heat such that a proportion of heat generated by the gearbox and the turbomachinery and dissipated to air is greater than $A \cdot NH+B$, and less than the lower of 1 and $C \cdot NH+D$, wherein A is equal to $-1.15$, B is equal to, or greater than, 1.48, C is equal to $-1.84$, D is in the range of from 2.10 to 2.30, preferably in the range of from 2.18 to 2.30, more preferably in the range of from 2.18 to 2.25, even more preferably in the range of from 2.20 to 2.25, and NH is the core shaft speed expressed as proportion of the core shaft maximum take-off speed and is in the range of from 0.65 to 1.

B may be equal to, or greater than, 1.5, or 1.52, or 1.54, or 1.56.

The method may comprise the step of operating the heat management system to provide the first amount of heat and the second amount of heat such that a first proportion of heat generated by the gearbox and the turbomachinery and dissipated to air at 85% of the core shaft maximum take-off speed is in the range of from 0.50 to 0.70, preferably in the range of from 0.50 to 0.65.

The method may comprise the step of operating the heat management system to provide the first amount of heat and the second amount of heat such that a second proportion of heat generated by the gearbox and the turbomachinery and dissipated to air at 0.65 of the core shaft maximum take-off speed is in the range of from 0.75 to 1, preferably in the range of from 0.80 to 1.

The method may comprise the step of operating the heat management system to provide the first amount of heat and the second amount of heat such that a ratio of the first proportion to the second proportion is in the range of from 0.45 to 0.65.

The method may comprise the step of operating the heat management system to provide at an environment temperature of ISA $+10°$ C. the first amount of heat and the second amount of heat such that the ratio of the first proportion to the second proportion is in the range of from 0.47 to 0.58.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel; wherein the heat management system is configured to provide the first amount of heat and the second amount of heat such that a proportion of heat generated by the gearbox and the turbomachinery and dissipated to air is greater than $A \cdot NH+B$, and less than the lower of 1 and $E \cdot (NH-1)+F$, wherein A is equal to $-1.15$, B is equal to, or greater than, 1.48, E is in the range of from $-1.16$ to $-3$, F is equal to, or greater than, 0.37, and NH is the core shaft speed expressed as proportion of the core shaft maximum take-off speed and is in the range of from 0.65 to 1, preferably in the range of from 0.65 to 0.95.

As used herein, proportions correspond to percentages, and vice versa, and therefore, for example, a proportion of 0.5 correspond to 50% and a proportion of 1 correspond to 100%.

In other words, when NH is 0.65 the core shaft speed is 65% of the core shaft maximum take-off speed, and when NH is 1 the core shaft speed is 100% of, or equal to, the core shaft The present inventor has understood that providing a heat management system configured to provide specific proportions of heat dissipated to air in the range of from 65% to 100% of the core shaft maximum take-off speed, i.e. substantially over the whole engine operational range, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

B may be equal to, or greater than, 1.5, or 1.52, or 1.54, or 1.56.

E may be in the range of from $-1.16$ to $-2.5$, preferably in the range of from $-1.16$ to $-1.95$.

NH may be in the range of from 0.65 to 0.90, preferably in the range of from 0.65 to 0.85.

The heat management system may be configured to provide the first amount of heat and the second amount of heat such that a first proportion of heat generated by the gearbox and the turbomachinery and dissipated to air at 85% of the core shaft maximum take-off speed is in the range of from 0.50 to 0.70.

The heat management system may be configured to provide at an environment temperature of ISA +40° C. the first amount of heat and the second amount of heat such that the first proportion is in the range of from 0.55 to 0.70, preferably in the range of from 0.60 to 0.70.

The heat management system may be configured to provide the first amount of heat and the second amount of heat such that a second proportion of heat generated by the gearbox and the turbomachinery and dissipated to air at 0.65 of the core shaft maximum take-off speed is in the range of from 0.75 to 1, preferably in the range of from 0.80 to 1.

The heat management system may be configured to provide at an environment temperature of ISA +40° C. the first amount of heat and the second amount of heat such that the second proportion is in the range of from 0.85 to 1, preferably in the range of from 0.90 to 1.

The heat management system may be configured to provide a ratio of the first proportion to the second proportion in the range of from 0.45 to 0.65, preferably from 0.47 to 0.58.

The heat management system may be configured to provide the first amount of heat and the second amount of heat such that at cruise conditions a proportion of heat generated by the gearbox and the turbomachinery and dissipated to air is in the range of from 0.56 to 0.75, preferably in the range of from 0.56 to 0.70.

The core shaft maximum take-off speed may be in the range of from 5500 rpm to 9500 rpm, preferably in the range of from 5500 rpm to 8500 rpm, preferably in the range of from 5500 rpm to 7500 rpm.

The fan may have a fan rotational speed at MTO conditions in the range of from 1500 rpm to 2800 rpm, preferably in the range of from 1600 rpm to 2500 rpm, more preferably in the range of from 1600 rpm to 2200 rpm.

The first heat sink may be bypass air, and the at least one air-lubricant heat exchanger may be adapted to receive bypass air from the bypass duct.

A flow restriction valve may be arranged downstream of the at least one air-lubricant heat exchanger to vary a mass flow rate of cooling air across the at least one air-lubricant heat exchanger, thereby varying the first amount of heat.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The first lubricant circuit may provide lubrication and cooling to the power gearbox.

The second lubricant circuit may provide lubrication and cooling to the turbomachinery bearings.

The gas turbine engine may comprise at least two air-lubricant heat exchangers to dissipate the first amount of heat to the first heat sink, of which at least one is arranged in the first lubricant circuit and at least one is arranged in the second lubricant circuit.

The combustor may be a lean burn combustor. The lean burn combustor may comprise a plurality of lean burn fuel spray nozzles, each fuel spray nozzle comprising a pilot fuel injector and a main fuel injector.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel; and wherein the method comprises the step of operating the heat management system to provide the first amount of heat and the second amount of heat such that a proportion of heat generated by the gearbox and the turbomachinery and dissipated to air is greater than $A \cdot NH+B$, and less than the lower of 1 and $E \cdot (NH-1)+F$, wherein A is equal to $-1.15$, B is equal to, or greater than, 1.48, E is in the range of from $-1.16$ to $-3$, preferably in the range of from $-1.16$ to $-2.5$, more preferably in the range of from $-1.16$ to $-1.95$, F is equal to, or greater than, 0.37, and NH is the core shaft speed expressed as proportion of the core shaft maximum take-off speed and is in the range of from 0.65 to 1, preferably in the range of from 0.65 to 0.95, more preferably in the range of from 0.65 to 0.90.

B may be equal to, or greater than, 1.5, or 1.52, or 1.54, or 1.56.

The method may comprise the step of operating the heat management system to provide the first amount of heat and the second amount of heat such that a first proportion of heat generated by the gearbox and the turbomachinery and dissipated to air at 85% of the core shaft maximum take-off speed is in the range of from 0.50 to 0.70.

The method may comprise the step of operating the heat management system to provide at an environment temperature of ISA +40° C. the first amount of heat and the second amount of heat such that the first proportion is in the range of from 0.55 to 0.70, preferably in the range of from 0.60 to 0.70.

The method may comprise the step of operating the heat management system to provide the first amount of heat and the second amount of heat such that a second proportion of heat generated by the gearbox and the turbomachinery and dissipated to air at 0.65 of the core shaft maximum take-off speed is in the range of from 0.75 to 1, preferably in the range of from 0.80 to 1.

According to an aspect there is provided a gas turbine engine for an aircraft comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel; wherein the heat management system is configured to provide the first amount of heat and the second amount of heat such that at cruise conditions a proportion of heat generated by the gearbox and the turbomachinery and dissipated to air is in the range of from 0.35 to 0.80.

The present inventor has understood that providing a heat management system configured to provide specific proportions of heat dissipated to air at cruise conditions, which may be the longest phase of flight, allows to provide adequate lubrication and cooling to the power gearbox and the turbomachinery bearings, minimise the size and therefore the weight of the heat exchangers, maximise SFC benefits and at the same time avoid fuel thermal degradation under all operating conditions.

The heat management system may be configured to provide the first amount of heat and the second amount of heat such that at cruise conditions the proportion of heat generated by the gearbox and the turbomachinery and dissipated to air is in the range of from 0.50 to 0.80, more preferably in the range of from 0.57 to 0.80.

The heat management system may be configured to provide the first amount of heat and the second amount of heat such that at cruise conditions and at an environment temperature of ISA +40° C. a proportion of heat generated by the gearbox and the turbomachinery and dissipated to air is in the range of from 0.65 to 0.80, preferably in the range of from 0.70 to 0.80.

The heat management system may be configured to provide the first amount of heat and the second amount of heat such that at cruise conditions and at an environment temperature of ISA +10° C. a proportion of heat generated by the gearbox and the turbomachinery and dissipated to air is in the range of from 0.45 to 0.70, preferably in the range of from 0.55 to 0.65.

The heat management system may be configured to provide the first amount of heat and the second amount of heat such that at cruise conditions and at an environment temperature in the range of from ISA +10° C. to ISA +40° C. a proportion of heat generated by the gearbox and the turbomachinery and dissipated to air is in the range of from 0.58 to 0.75.

A first proportion of heat generated by the gearbox and the turbomachinery and dissipated to air is defined as $$\left(\frac{\text{first amount of heat 111}}{\text{first amount of heat 111 + second amount of heat 112}}\right)85\% \, MTO$$

at 85% of a core shaft maximum take-off speed, and the heat management system may be configured to provide the first amount of heat and the second amount of heat such that the first proportion of heat generated by the gearbox and the turbomachinery and dissipated to air is in the range of from 0.35 to 0.70, preferably in the range of from 0.45 to 0.70, more preferably in the range of from 0.50 to 0.70.

The heat management system is configured to provide at an environment temperature of ISA +10° C. the first amount of heat and the second amount of heat such that the first proportion of heat generated by the gearbox and the turbomachinery and dissipated to air at 85% of the core shaft maximum take-off speed is in the range of from 0.35 to 0.65, preferably in the range of from 0.40 to 0.60, more preferably in the range of from 0.45 to 0.55.

A second proportion of heat generated by the gearbox and the turbomachinery and dissipated to air is defined as $$\left(\frac{\text{first amount of heat 111}}{\text{first amount of heat 111 + second amount of heat 112}}\right)0.65\,MTO$$

at 65% of the core shaft maximum take-off speed, and the heat management system may be configured to provide the first amount of heat and the second amount of heat such that the second proportion of heat generated by the gearbox and the turbomachinery and dissipated to air is in the range of from 0.60 to 1, preferably in the range of from 0.70 to 1, more preferably in the range of from 0.75 to 1.

The heat management system may be configured to provide at an environment temperature of ISA +10° C. the first amount of heat and the second amount of heat such that the second proportion of heat generated by the gearbox and the turbomachinery and dissipated to air at 0.65 of the core shaft maximum take-off speed is in the range of from 0.80 to 0.92.

The heat management system may be configured to provide at an environment temperature of ISA +10° C. the first amount of heat and the second amount of heat such that a ratio of the first proportion to the second proportion is in the range of from 0.45 to 0.65.

The heat management system may be configured to provide the first amount of heat and the second amount of heat such that a proportion of heat generated by the gearbox and the turbomachinery and dissipated to air is greater than A·NH+B, and less than the lower of 1 and C·NH+D, wherein A is equal to −1.15, B is equal to, or greater than, 1.48, C is equal to −1.84, D is in the range of from 2.10 to 2.30, preferably in the range of from 2.18 to 2.30, more preferably in the range of from 2.18 to 2.25, even more preferably in the range of from 2.20 to 2.25; and NH is the core shaft speed expressed as proportion of the core shaft maximum take-off speed and is in the range of from 0.65 to 1, preferably in the range of from 0.65 to 0.85. B may be equal to, or greater than, 1.5, or 1.52, or 1.54, or 1.56.

The core shaft may have a rotational speed at cruise conditions in the range of from 5000 rpm to 9000 rpm, or in the range of from 5000 rpm to 7000 rpm, or in the range of from 5000 rpm to 6000 rpm.

The fan may have a fan rotational speed at cruise conditions in the range of from 1400 rpm to 2600 rpm, preferably in the range of from 1500 rpm to 2300 rpm, more preferably in the range of from 1600 rpm to 2000 rpm.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The heat management system may include a modulation device adapted to adjust a lubricant flow distribution between the power gearbox and the turbomachinery bearings.

The gas turbine engine may comprise at least two air-lubricant heat exchangers to dissipate the first amount of heat to the first heat sink, of which at least one is arranged in the first lubricant circuit and at least one is arranged in the second lubricant circuit.

The heat management system may comprise a lubricant tank in fluid communication with, and feeding lubricant to, the first and second lubricant circuits.

According to an aspect there is provided a method of operating a gas turbine engine for an aircraft, the method comprising providing a gas turbine engine comprising: an engine core comprising a compressor, a combustor, a turbine, and a core shaft connecting the turbine to the compressor; a fan comprising a plurality of fan blades and arranged upstream of the engine core; turbomachinery bearings; a power gearbox adapted to drive the fan at a lower rotation speed than the turbine; and a heat management system configured to provide lubrication and cooling to the gearbox and turbomachinery bearings, and comprising a pipe assembly adapted to provide a lubricant flow to the gearbox and turbomachinery bearings, at least one air-lubricant heat exchanger to dissipate a first amount of heat to a first heat sink, and at least one fuel-lubricant heat exchanger to dissipate a second amount of heat to a second heat sink, wherein the first heat sink is air and the second heat sink is fuel; and wherein the method comprises the step of operating the heat management system to provide the first amount of heat and the second amount of heat such that at cruise conditions a proportion of heat generated by the gearbox and the turbomachinery and dissipated to air is in the range of from 0.35 to 0.80, preferably in the range of from 0.50 to 0.80, more preferably in the range of from 0.57 to 0.80.

The method may comprise the step of operating the heat management system to provide the first amount of heat and the second amount of heat such that at cruise conditions and at an environment temperature of ISA +40° C. a proportion of heat generated by the gearbox and the turbomachinery and dissipated to air is in the range of from 0.65 to 0.80, preferably in the range of from 0.70 to 0.80.

The method may comprise the step of operating the heat management system to provide the first amount of heat and the second amount of heat such that at cruise conditions and at an environment temperature of ISA +10° C. a proportion of heat generated by the gearbox and the turbomachinery and dissipated to air is in the range of from 0.45 to 0.70, preferably in the range of from 0.55 to 0.65.

The method may comprise the step of operating the heat management system to provide the first amount of heat and the second amount of heat such that at cruise conditions and at an environment temperature in the range of from ISA +10° C. to ISA +40° C. a proportion of heat generated by the gearbox and the turbomachinery and dissipated to air is in the range of from 0.58 to 0.75.

In any of the aspects described above, one or more of the following features may be present.

The core shaft maximum take-off speed may be in the range of from 5500 rpm to 9500 rpm, preferably in the range of from 5500 rpm to 8500 rpm, preferably in the range of from 5500 rpm to 7500 rpm, preferably in the range of from 5500 rpm to 6500 rpm, preferably in the range of from 5800 rpm to 6200 rpm. Accordingly, 85% of the core shaft maximum take-off speed may be in the range of from 4675 rpm to 8075 rpm, preferably in the range of from 4675 rpm to 7225 rpm, preferably in the range of from 4675 rpm to 6375 rpm, preferably in the range of from 4675 rpm to 5525 rpm, preferably in the range of from 4930 rpm to 5270 rpm; and 65% of the core shaft maximum take-off speed may be in the range of from 3575 rpm to 6175 rpm, preferably in the range of from 3575 rpm to 5525 rpm, preferably in the range of from 3575 rpm to 4875 rpm, preferably in the range of from 3575 rpm to 4225 rpm, preferably in the range of from 3770 rpm to 4030 rpm.

The core shaft may have a rotational speed at cruise conditions in the range of from 5000 rpm to 9000 rpm, or in the range of from 5000 rpm to 7000 rpm, or in the range of from 5000 rpm to 6000 rpm, or in the range of from 5200 rpm to 5800 rpm.

The fan may have a fan rotational speed at MTO conditions in the range of from 1500 rpm to 2800 rpm, preferably in the range of from 1600 rpm to 2500 rpm, more preferably in the range of from 1600 rpm to 2200 rpm, even more preferably in the range of from 1700 rpm to 1900 rpm.

The fan may have a fan rotational speed at cruise conditions in the range of from 1400 rpm to 2600 rpm, preferably in the range of from 1500 rpm to 2300 rpm, more preferably in the range of from 1600 rpm to 2000 rpm.

The first heat sink may be bypass air flowing across a bypass duct of the gas turbine engine, and/or external air.

A flow restriction valve may be arranged downstream of the at least one air-lubricant heat exchanger to vary a mass flow rate of cooling air across the at least one air-lubricant heat exchanger, thereby varying the first amount of heat.

The at least one air-lubricant heat exchanger may be arranged at, or in close proximity to, a bypass duct of the gas turbine engine.

The pipe assembly may comprise a first lubricant circuit adapted to provide a first lubricant flow and a second lubricant circuit adapted to provide a second lubricant flow, the at least one air-lubricant heat exchanger being arranged in the first lubricant circuit and the at least one fuel-lubricant heat exchanger being arranged in the second lubricant circuit.

The first lubricant circuit may comprise a bypass to the at least one air-lubricant heat exchanger. By adjusting the first lubricant mass flow rate in the bypass the amount of heat dissipated to the first heat sink may be adjusted.

The second lubricant circuit may comprise a bypass to the at least one fuel-lubricant heat exchanger. By adjusting the second lubricant mass flow rate in the bypass the amount of heat dissipated to the second heat sink may be adjusted.

The heat management system may include a modulation device adapted to adjust a lubricant flow distribution between the power gearbox and the turbomachinery bearings. The modulation device may include one or more pump devices, for example one or more hydraulic pumps, like gear pumps, rotary vane pumps, and the like, and/or one or more metering orifices.

The modulation device may include a first pump device arranged in the first lubricant circuit to adjust the first lubricant flow and a second pump device arranged in the second lubricant circuit to adjust the second lubricant flow.

The heat management system may comprise a lubricant tank in fluid communication with, and feeding lubricant to, the first and second lubricant circuits.

The heat management system may comprise a first lubricant tank in fluid communication with, and feeding lubricant to, the first lubricant circuit and a second lubricant tank in fluid communication with, and feeding lubricant to, the second lubricant circuit.

The first lubricant circuit may provide lubrication and cooling to the power gearbox.

The second lubricant circuit may provide lubrication and cooling to the turbomachinery bearings. The second lubricant circuit may provide cooling to power electronics of the gas turbine engine.

The gas turbine engine may comprise at least two air-lubricant heat exchangers to dissipate the first amount of heat to the first heat sink, of which at least one is arranged in the first lubricant circuit and at least one is arranged in the second lubricant circuit.

The fan may have a fan diameter in the range of from 210 cm to 380 cm, or from 210 cm to 370 cm, or from 220 cm to 370 cm, for example from 340 to 370.

The power gearbox may have a gear ratio in the range of from 2.9 to 4.0, or from 3.0 to 3.8, or from 3.1 to 3.7.

The lubricant may be oil.

The at least one air-lubricant heat exchanger may be a Matrix Air-Cooled Oil Cooler (MACOC).

The at least one fuel-lubricant heat exchanger may be a Fuel-Oil Heat Exchanger (FOHE).

The combustor may be a lean burn combustor. The lean burn combustor may comprise a plurality of lean burn fuel spray nozzles, each fuel spray nozzle comprising a pilot fuel injector and a main fuel injector.

The inventor has found that even in gas turbine engines with a lean burn combustor, wherein the thermal requirement are more stringent, a thermal management system as described allows to maximise SFC and avoid risk of fuel thermal degradation in all operating conditions.

As noted elsewhere herein, the present disclosure relates to a gas turbine engine. Such a gas turbine engine comprises an engine core comprising a turbine, a combustor, a compressor, and a core shaft connecting the turbine to the compressor. Such a gas turbine engine comprises a fan (having fan blades) located upstream of the engine core.

Arrangements of the present disclosure are particularly beneficial for fans that are driven via a power gearbox. Accordingly, the gas turbine engine comprises a power gearbox that receives an input from the core shaft and outputs drive to the fan so as to drive the fan at a lower rotational speed than the core shaft. The input to the power gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The power gearbox may be arranged to be driven by the core shaft that is configured to rotate (for example in use) at the lowest rotational speed (for example the first core shaft in the example above). For example, the power gearbox may be arranged to be driven only by the core shaft that is configured to rotate (for example in use) at the lowest rotational speed (for example only be the first core shaft, and not the second core shaft, in the example above). Alternatively, the power gearbox may be arranged to be driven by any one or more shafts, for example the first and/or second shafts in the example above.

The power gearbox may be a reduction gearbox (in that the output to the fan is a lower rotational rate than the input from the core shaft). Any type of power gearbox may be used. For example, the power gearbox may be a "planetary" or "star" gearbox, as described in more detail elsewhere herein. The power gearbox may have any desired reduction ratio (defined as the rotational speed of the input shaft divided by the rotational speed of the output shaft), for example greater than 2.5, for example in the range of from 2.9 to 4.2, 3 to 4.2, 3 to 4, 3 to 3.8, or 3.2 to 3.8, for example on the order of or at least 2.9, 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the power gearbox may be a "star" gearbox having a ratio in the range of from 3.1 or 3.2 to 3.8. In some arrangements, the gear ratio may be outside these ranges.

In any gas turbine engine as described and/or claimed herein, a combustor is provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 420 cm, or from 210 cm to 240 cm, or 250 cm to 280 cm, or 320 cm to 380 cm, or 340 cm to 370 cm.

The rotational speed of the fan may vary in use. Generally, the rotational speed is lower for fans with a higher diameter. Purely by way of non-limitative example, the rotational speed of the fan at cruise conditions may be less than 2800 rpm, for example less than 2600 rpm, or less than 2500 rpm, or less than 2300 rpm, or less than 2200 rpm, or less than 2000 rpm. Purely by way of non-limitative example, the rotational speed of the fan at cruise conditions may be greater than 1200 rpm, or greater than 1300 rpm, or greater than 1400 rpm, or greater than 1500 rpm, or greater than 1600 rpm. Purely by way of non-limitative example the rotational speed of the fan at cruise conditions may be in the range of from 1400 rpm to 2800 rpm, or in the range of from 1600 rpm to 2500 rpm, or in the range of from 1600 rpm to 2200 rpm. Purely by way of further non-limitative example, the rotational speed of the fan at cruise conditions for an engine having a fan diameter in the range of from 210 cm to 300 cm (for example 240 cm to 280 cm or 250 cm to 270 cm) may be in the range of from 1700 rpm to 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint - in terms of time and/or distance - between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft - steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

A gas turbine engine described and/or claimed herein may be provided to an aircraft. The aircraft is the aircraft for which the gas turbine engine has been designed to be attached.

Accordingly, the cruise conditions according to this aspect correspond to the mid-cruise of the aircraft, as defined elsewhere herein.

A gas turbine engine described and/or claimed herein may be operated at the cruise conditions as defined elsewhere herein (for example in terms of the thrust, atmospheric conditions and Mach Number). A gas turbine engine described and/or claimed herein may be operated at the mid-cruise of the aircraft, as defined elsewhere herein.

Except where mutually exclusive, any feature or parameter described herein may be combined with any other feature or parameter described herein. For example, any of the ranges of the proportion of the heat generated by the power gearbox and the turbomachinery and dissipated to air at any of the environmental temperatures may be applied to any of the aspect disclosed herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
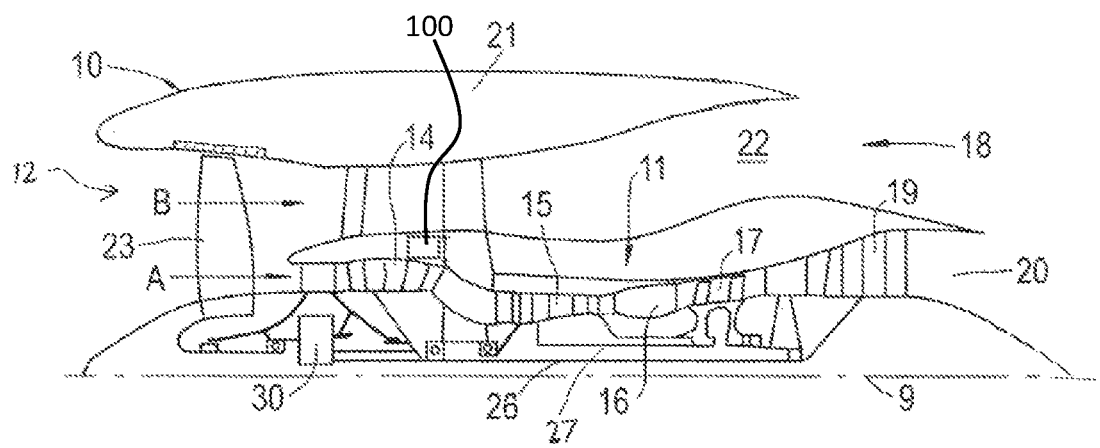
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. In an embodiment the combustion equipment 16 may comprise a lean burn combustor comprising a plurality of fuel spray nozzles, each fuel spray nozzle comprising a pilot fuel injector and a main fuel injector. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a core shaft 26 and a power gearbox 30 of the epicyclic type. The gas turbine engine 10 further includes a heat management system 100 which will be described in more details herein after.

In use, the core airflow A is accelerated in a core duct, compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
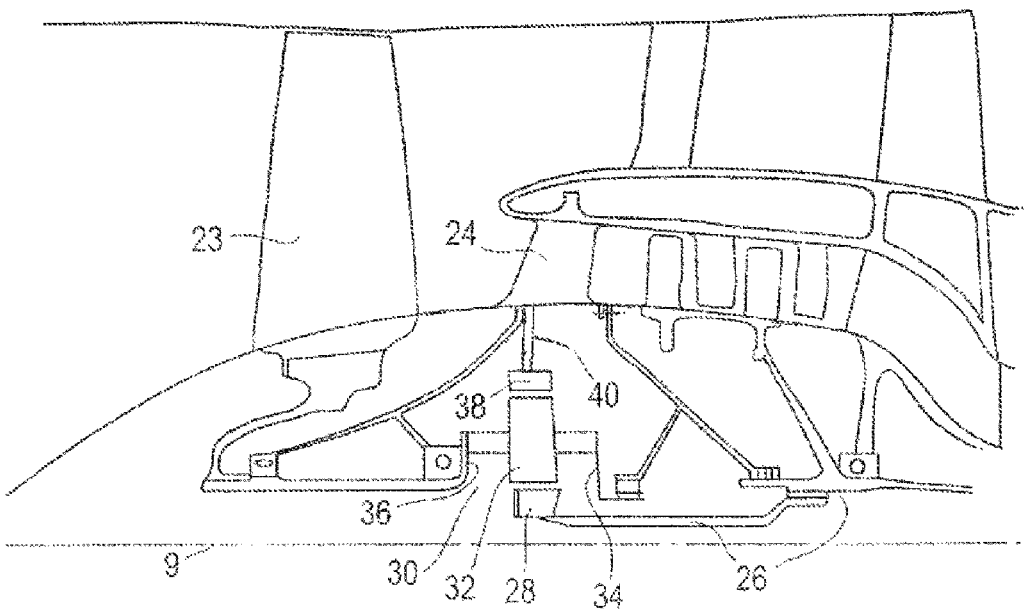
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the core shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the core shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
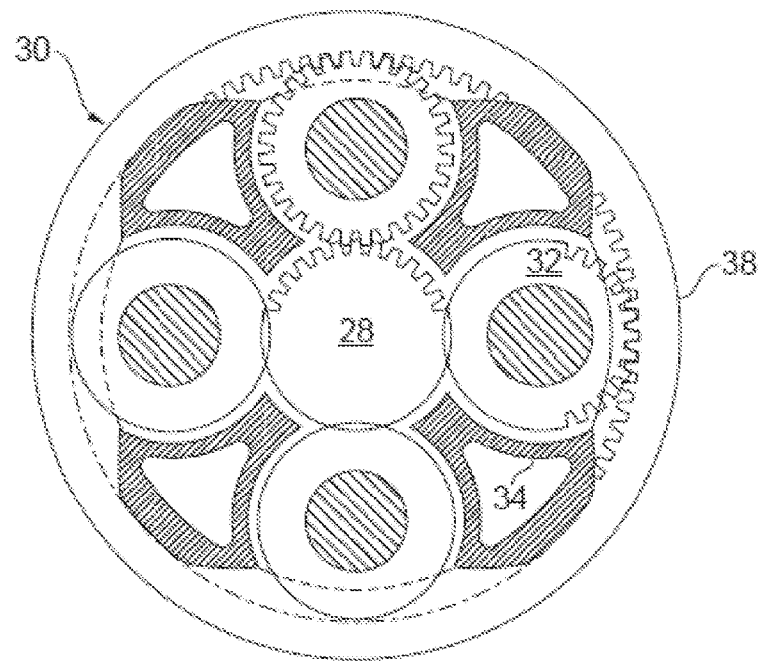
FIG. 3 is a partially cut-away view of a power gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input, core shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular. As used herein, front and rear is with respect to the gas turbine engine, i.e. the fan being in the front and the turbine being in the rear of the engine, and forward refers to the direction from the rear to the front of the gas turbine engine.

Figure 4:
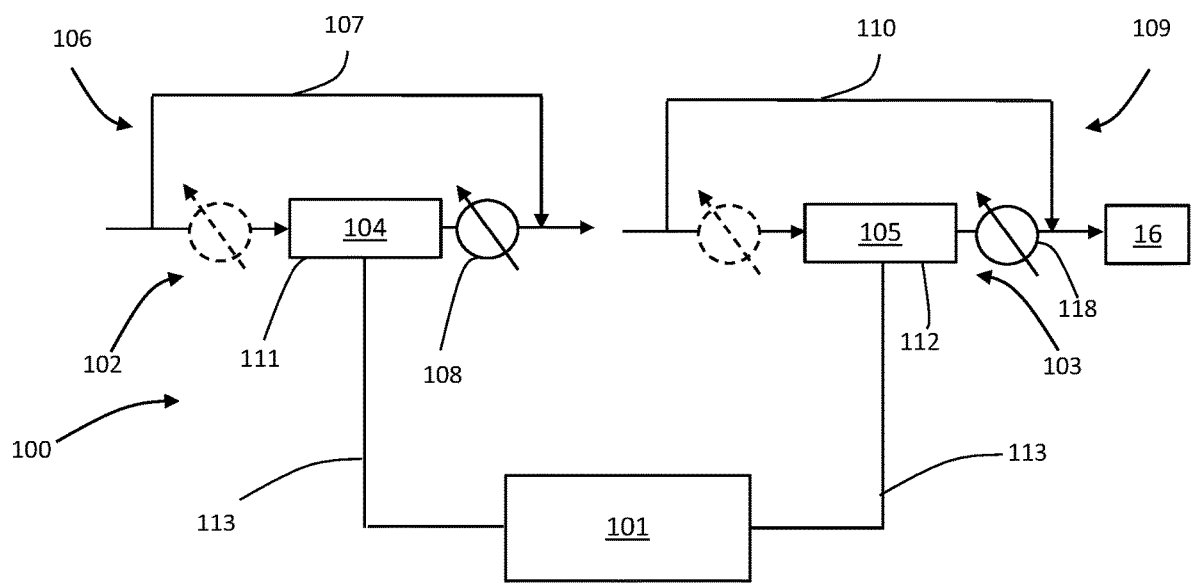
FIG. 4 is a functional schematic layout of a heat management system according to the disclosure.

FIG. 4 shows a functional schematic layout of the heat management system 100.

The heat management system 100 comprises a lubricant circuit 113 with a pipe assembly adapted to provide a flow of lubricant, for example oil, to all of the components of the gas turbine engine that need lubrication and cooling. The lubricant circuit 113 may have any suitable layout, as it will be further illustrated with reference to FIGS. 5-8. Box 101 represents gas turbine engine components generating heat, or in other words, the heat generated by such components and removed by the lubricant. The components that need lubrication and cooling generally include the power gearbox and turbomachinery bearings, and may also include accessory gearbox(es), power electronics and electrical machines (if present). Turbomachinery bearings refer to bearings, such as journal bearings or rolling element bearings, arranged between rotating and stationary parts of the engine, such as the core shaft and any other interconnecting shafts, the compressor(s) and the turbine(s). Power electronics may be part of an electrical power management/generation system including electrical machine(s), generator(s) and/or batteries. For sake of simplicity, in the present disclosure the term "turbomachinery bearings" includes any component of the gas turbine engine other than the power gearbox that generates heat and is cooled by the heat management system 100.

The heat 101 generated by the power gearbox and turbomachinery bearings is dissipated to a first heat sink 102 and to a second heat sink 103. The first heat sink 102 is air. The second heat sink 103 is fuel. The heat management system 100 includes an air-oil heat exchanger (air-cooled oil heat exchanger) 104 and a fuel-oil heat exchanger (fuel-cooled oil heat exchanger) 105. Both the air-oil and fuel-oil heat exchangers 104, 105 may be a plurality of air-oil heat exchangers 104 and a plurality of fuel-oil heat exchangers 105.

The air-oil heat exchanger 104 is for example a Matrix Air-Cooled Oil Cooler (MACOC). The air-oil heat exchanger 104 may be arranged in, or in close proximity to, the bypass duct 22 such that a first amount of heat 111 is rejected to the bypass airflow B. In an embodiment, the air-oil heat exchanger 104 may be arranged in the nacelle 21 and the first amount of heat 111 is rejected to external air. In another embodiment, the air-oil heat exchanger 104 may be arranged in other parts of the engine. In a further embodiment, the heat management system 100 may comprises one or more air-oil heat exchangers 104 arranged at, or in close proximity to, the bypass duct 22 and/or one or more air-oil heat exchangers 104 arranged in the nacelle 21. In other words, the first heat sink 102 may be bypass air or external air, or both. Where more than one air-oil heat exchangers 104 are used, the first amount of heat 111 is the sum of the heat dissipated by each air-oil heat exchanger 104.

In more details, an air circuit 106 provides cooling air (either or both bypass air and external air) to the air-oil heat exchanger 104. More than one air-oil heat exchangers 104 may be provided in the air circuit 106, either in series or in parallel. An air bypass 107 may be provided in the air circuit 106. The air bypass 107 allows to vary the air mass flow rate passing across the air-oil heat exchanger 104, for example to compensate for different environmental conditions the gas turbine engine may experience. Heated air is then discharged either in the bypass duct 22 or channelled elsewhere, for example to atmosphere. A modulation device 108 is provided to vary the first amount of heat 111. In the illustrated embodiment the modulation device 108 is a flow restriction valve arranged downstream of the air-oil heat exchanger 104 and adapted to vary the cooling air mass flow rate across the air-oil heat exchanger 104. The air bypass 107 may be omitted. If the air bypass 107 is present, the modulation device is arranged upstream of the air bypass 107 return along the air circuit 106, as illustrated. In embodiments, the modulation device 108 may be arranged elsewhere, for example upstream of the air-oil heat exchanger 104 as illustrated in dotted line in FIG. 4.

In embodiments, the modulation device 108 may be any device or condition that allows to vary the air flow and/or the lubricant flow, such as for example: one or more air flow control valves; one or more oil flow control valves; one or more compressors/pumps (either or both in the air circuit 106 and the lubricant circuit 113); the air bypass 107; and/or variations of the gas turbine engine conditions that vary the air mass flow rate in the air circuit 106 and/or the lubricant mass flow rate in the lubricant circuit 113 in order to vary the first amount of heat 111 exchanged between the lubricant and the first heat sink 102.

The fuel-oil heat exchanger 105, or FOHE, is for example a shell and tube heat exchanger where fuel is channelled in the tubes, or a plate-fin heat exchanger. The fuel-oil heat exchanger 105 is arranged along a fuel circuit 109 that provides fuel to the combustion equipment 16. More than one fuel-oil heat exchangers 105 may be provided in the fuel circuit 109, either in series or in parallel. The fuel may be aviation kerosene. The fuel circuit 109 may comprise a fuel bypass 110, which allows to vary the fuel mass flow rate that passes across the fuel-oil heat exchanger 105, for example to compensate for different environmental conditions the gas turbine engine may experience. The fuel receive a second amount of heat 112. Heat dissipated to the fuel is retained in the engine thermodynamic cycle and therefore fuel is a convenient heat sink for heat generated by the power gearbox and the turbomachinery bearings.

A modulation device 118 is provided to vary the second amount of heat 112. In the illustrated embodiment, the modulation device 118 is a flow restriction valve arranged in the fuel circuit 109 downstream of the fuel-oil heat exchanger 105 and upstream of the fuel bypass 110 return. In embodiments, the modulation device 118 may be arranged elsewhere, for example upstream of the fuel-oil heat exchanger 105 as illustrated in dotted line in FIG. 4, and may be any device or condition that allows to vary the fuel flow and/or the lubricant flow, such as for example: one or more fuel flow control valves; one or more lubricant flow control valves; one or more pumps (either or both in the fuel circuit 109 and the lubricant circuit 113); the fuel bypass 110; and/or variations of the gas turbine engine conditions that vary the fuel mass flow rate in the fuel circuit 109 and/or the lubricant mass flow rate in the lubricant circuit 113 in order to vary the second amount of heat 112 exchanged between the lubricant and the second heat sink 103.

Ideally one would maximise the second amount of heat 112 to obtain SFC benefits, without incurring fuel degradation. However, the capacity of the second heat sink 103 to exchange heat and the amount of heat generated by the engine generally varies depending on the engine conditions. At low power conditions, for example at flight idle, the amount of heat generated by the engine is relatively low, but at the same time also the fuel mass flow rate in the fuel circuit 109 is relatively low, therefore decreasing the second amount of heat 112 that can be safely transferred to the fuel; at high power conditions, for example at maximum take-off, the amount of heat generated by the engine is relatively high, but also the fuel mass flow rate in the fuel circuit 109 is relatively high, allowing to increase the second amount of heat 112 that can be safely transferred to the fuel.

The engine operations conditions have an impact also on the capacity of the first heat sink 102 to dissipate heat, i.e. on the first amount of heat 111; for example, at ground idle the bypass flow B is minimal and generally increases with the core shaft speed. However, the capacity of the first heat sink 102 and of the second heat sink 103 to dissipate heat does not generally vary proportionally with the core shaft speed. To this purpose, the heat management system 100 is configured to vary the first amount of heat 111 and the second amount of heat 112 at different engine conditions, i.e. at different core shaft speeds, such that their ratios are within specific ranges which allow to minimise the dimensions (and therefore the weight) of the heat exchangers 104, 105 and to maximise the second amount of heat 112 for all of the engine operation conditions, in particular at cruise where the majority of fuel is burnt, and therefore to maximise SFC.

The heat management system 100 is configured to provide the first amount of heat 111 and the second amount of heat 112 such that a first proportion of the heat generated by the power gearbox and the turbomachinery and dissipated to air defined as:

$$\left(\frac{\text{first amount of heat 111}}{\text{first amount of heat 111 + second amount of heat 112}}\right)85\%\ MTO$$

at 85% of the core shaft maximum take-off speed is in the range of from 0.25 to 0.70, for example equal to 0.55; and a second proportion of the heat generated by the power gearbox and the turbomachinery and dissipated to air defined as:

$$\left(\frac{\text{first amount of heat 111}}{\text{first amount of heat 111 + second amount of heat 112}}\right)65\%\ MTO$$

at 65% of the core shaft maximum take-off speed is in the range of from 0.60 to 1, for example equal to 0.85.

In embodiments, the first proportion may be, greater than 0.25, or greater than 0.30, or greater than 0.35, or greater than 0.40, or greater than 0.45, or greater than 0.50, or greater than 0.55, and less than 0.70, or less than 0.65, for example in the range of from 0.25 to 0.70, or in the range of from 0.35 to 0.70, or in the range of from 0.45 to 0.70, or in the range of from 0.50 to 0.70, or in the range of from 0.55 to 0.70, or in the range of from 0.55 to 0.65.

In embodiments, the second proportion may be greater than 0.60, or greater than 0.65, or greater than 0.70, or greater than 0.75, and less than 1, or less than 0.95, for example in the range of from 0.60 to 1, or in the range of from 0.65 to 1, or in the range of from 0.70 to 1, or in the range of from 0.75 to 1, or in the range of from 0.75 to 0.95.

The core shaft maximum take-off speed may be in the range of from 5500 to 9500 rpm. Accordingly, 85% of the core shaft maximum take-off speed may be in the range of from 4675 to 8075 rpm, and 65% of the core shaft maximum take-off speed may be in the range of from 3575 to 6175 rpm.

For example, for gas turbine engines with a fan diameter comprised between 210 cm and 330 cm the core shaft maximum take-off speed may be in the range of from 6700 to 9500 rpm; for gas turbine engines with a fan dimeter comprised between 330 cm and 380 cm the core shaft maximum take-off speed may be in the range of from 5500 to 6700 rpm.

In an embodiment, the core shaft maximum take-off speed may be in the range of from 5500 rpm to 6500 rpm, and therefore 85% of the core shaft maximum take-off speed may be in the range of from 4675 to 5525 rpm, and 65% of the core shaft maximum take-off speed may be in the range of from 3575 to 4225 rpm.

The fan may have a fan rotational speed at MTO conditions in the range of from 1500 rpm to 2800 rpm, preferably in the range of from 1600 rpm to 2500 rpm, more preferably in the range of from 1600 rpm to 2200 rpm, even more preferably in the range of from 1700 rpm to 1900 rpm.

At cruise conditions, the core shaft may have a rotational speed in the range of from 5000 rpm to 9000 rpm, or in the range of from 5000 rpm to 7000 rpm, or in the range of from 5000 rpm to 6000 rpm, or in the range of from 5200 rpm to 5800 rpm.

At cruise conditions, the fan may have a fan rotational speed in the range of from 1400 rpm to 2600 rpm, preferably in the range of from 1500 rpm to 2300 rpm, more preferably in the range of from 1600 rpm to 2000 rpm.

At cruise conditions, the heat management system 100 may be configured to provide the first amount of heat 111 and the second amount of heat 112 such that proportion of heat generated by the power gearbox and the turbomachinery and dissipated to air is in the range of from 0.35 to 0.80, or in the range of from 0.50 to 0.80, or in the range of from 0.57 to 0.80, or in the range of from 0.57 to 0.75, or in the range of from 0.56 to 0.70, for example 0.65.

Furthermore, the heat management system 100 may be configured to provide the first amount of heat 111 and the second amount of heat 112 such that a ratio of the first proportion to the second proportion is in the range of range from 0.45 to 0.65, preferably in the range of from 0.45 to 0.60, more preferably in the range of from 0.47 to 0.58, for example 0.57.

Moreover, the environment conditions, and in particular the environment temperature has an impact on the capacity of the first heat sink 102 and of the second heat sink 103 to dissipate the heat generated by the power gearbox and the turbomachinery bearings. The inventor has found that such capacity does not vary with the environment temperature in the same way for the first and second heat sinks 102, 103. In other words, the amounts of heat that (external or bypass) air and fuel can reject vary with temperature.

For this reason, the heat management system 100 may be configured to vary the first amount of heat 111 and the second amount of heat 112 depending on the environment temperature such to provide specific first and second proportions of heat generated by the power gearbox and the turbomachinery and dissipated to air which allow to maximise the second amount of heat 112, maximise SFC, minimise the dimensions (and therefore the weight) of the heat exchangers 104, 105, without incurring fuel degradation.

To this purpose the heat management system 100 may be configured to provide the first proportion of heat generated by the power gearbox and the turbomachinery and dissipated to air at an environment temperature of ISA +40° C. in the range of from 0.55 to 0.70, or in the range of from 0.60 to 0.70, or in the range of from 0.62 to 0.68, for example 0.65.

Moreover, the heat management system 100 may be configured to provide the second proportion of heat generated by the power gearbox and the turbomachinery and dissipated to air at an environment temperature of ISA +40° C. in the range of from 0.85 to 1, or in the range of from 0.90 to 1, or from 0.92 to 1, or from 0.92 to 0.98, for example 0.95.

As the environment temperature decreases, air and fuel temperatures decrease, and the amount of heat that can be rejected to air and fuel increases, as though not proportionally to each other. Accordingly, to maximise SFC, minimise the dimensions (and therefore the weight) of the heat exchangers 104, 105, without incurring fuel degradation, the heat management 100 may also be configured to provide the first proportion within specific ranges at different environment temperatures.

At an environment temperature of ISA +10° C., the heat management system 100 may be configured to provide the first amount of heat 111 and the second amount of heat 112 such as to provide the first proportion of heat generated by the power gearbox and the turbomachinery and dissipated to air in the range of from 0.35 to 0.65, or in the range of from 0.40 to 0.60, or in the range of from 0.45 to 0.55, for example 0.50.

At an environment temperature of ISA +10° C. the heat management system 100 may be configured to provide the first amount of heat 111 and the second amount of heat 112 such as to provide the second proportion of heat generated by the power gearbox and the turbomachinery and dissipated to air in the range of from 0.60 to 0.95, or in the range of from 0.70 to 0.95, or in the range of from 0.75 to 0.95, or in the range of from 0.80 to 0.92, for example 0.86.

At an environment temperature of ISA −69° C. the heat management 100 may be configured to provide the first amount of heat 111 and the second amount of heat 112 such as to provide the first proportion of heat generated by the power gearbox and the turbomachinery and dissipated to air in the range of from 0.20 to 0.40, or in the range of from 0.20 to 0.35, or in the range of from 0.20 to 0.30, for example 0.25.

At an environment temperature of ISA −69° C. the heat management system 100 may be configured to provide the first amount of heat 111 and the second amount of heat 112 such as to provide the second proportion of heat generated by the power gearbox and the turbomachinery and dissipated to air in the range of from 0.40 to 0.75, or in the range of from 0.50 to 0.75, or in the range of from 0.55 to 0.70, for example 0.63.

At an environment temperature of ISA +40° C. the heat management system 100 may also be configured to provide the first amount of heat 111 and the second amount of heat 112 such as to provide a ratio of the first proportion to the second proportion in the range of from 0.50 to 0.80, or in the range of from 0.55 to 0.75, or in the range of from 0.60 to 0.70, for example 0.65.

At an environment temperature of ISA +10° C. the heat management system 100 may be configured to provide the first amount of heat 111 and the second amount of heat 112 such as to provide a ratio of the first proportion to the second proportion in the range of from 0.40 to 0.65, or in the range of from 0.45 to 0.65, or in the range of from 0.50 to 0.60, for example 0.57.

At an environment temperature of ISA −69° C. the heat management system 100 may be configured to provide the first amount of heat 111 and the second amount of heat 112 such as to provide a ratio of the first proportion to the second proportion in the range of from 0.30 to 0.55, or in the range of from 0.30 to 0.50, or in the range of from 0.35 to 0.45, for example 0.40.

By providing the first amount of heat 111 and the second amount of heat 112 such that the ratios of the first proportion to the second proportion at different environment temperatures are as provided above, SFC may be maximised and fuel degradation may be avoided in all environment conditions and engine running conditions.

Moreover the heat management system 100 may be configured to provide the first amount of heat 111 and the second amount of heat 112 such that the ratio of the first proportion at an environment temperature of ISA +40° C. to the first proportion at an environment temperature of ISA −69° C. is in the range of from 1.5 to 4.5, or in the range of from 2 to 4, or in the range of from 2 to 3.5, for example 2.6.

The heat management system 100 may be configured to provide the first amount of heat 111 and the second amount of heat 112 such that the ratio of the second proportion at an environment temperature of ISA +40° C. to the second proportion at an environment temperature of ISA −69° C. is in the range of from 1.0 to 2.1, or in the range of from 1.2 to 2.1, or in the range of from 1.4 to 2.0, for example 1.6.

Moreover the heat management system 100 may be configured to provide the first amount of heat 111 and the second amount of heat 112 such that the ratio of the first proportion at an environment temperature of ISA +40° C. to the first proportion at an environment temperature of ISA +10° C. is in the range of from 1.20 to 1.42, or in the range of from 1.22 to 1.41, or in the range of from 1.25 to 1.40, for example 1.3.

Moreover the heat management system 100 may be configured to provide the first amount of heat 111 and the second amount 112 of heat such that a ratio of the second proportion at an environment temperature of ISA +40° C. to the second proportion at an environment temperature of ISA +10° C. is in the range of from 1.10 to 1.25, or in the range of from 1.10 to 1.22, or in the range of from 1.11 to 1.20, for example 1.16.

The heat management system 100 may be configured to provide the first amount of heat 111 and the second amount of heat 112 such that a proportion (expressed as fraction) of heat generated by the power gearbox and the turbomachinery and dissipated to air is greater than A·NH+B, and less than 1, wherein A is equal to −1.15, B is equal to, or greater than, 1.48, and NH is a core shaft speed expressed as proportion of the core shaft maximum take-off speed and is in the range of from 0.65 to 1.

B may be equal to, or greater than, 1.5, or 1.52, or 1.54, or 1.56.

The heat management system may be configured to provide the first amount of heat and the second amount of heat such that the proportion of heat generated by the power gearbox and the turbomachinery and dissipated to air is
less than the lower of 1 and C·NH+D,
wherein C is equal to −1.84, D is in the range of from 2.10 to 2.30, and NH is in the range of from 0.65 to 1.

D may be in the range of from 2.18 to 2.30, or in the range of from 2.18 to 2.25 or in the range of from 2.20 to 2.25.

For example at 85% of the core shaft maximum take-off speed (i.e. NH=0.85), and being D equal to 2.20, the proportion of heat generated by the power gearbox and the turbomachinery and dissipated to air may be greater than 50.25% (i.e. −1.15−0.85+1.48=0.5025, or 50.25%) and lower than 63.6% (i.e. −1.84−0.85+2.20=0.636, or 63.6%).

The heat management system may be configured to provide the first amount of heat and the second amount of heat such that the proportion of heat generated by the power gearbox and the turbomachinery and dissipated to air is
greater than A·NH+B, and less than the lower of 1 and E·(NH−1)+F,
wherein A is equal to −1.15, B is equal to, or greater than, 1.48, E is in the range of from −1.16 to −3, F is equal to, or greater than, 0.37, and NH is the core shaft speed expressed as proportion of the core shaft maximum take-off speed and is in the range of from 0.65 to 1.

B may be equal to, or greater than, 1.5, or 1.52, or 1.54, or 1.56.

E may be in the range of from −1.16 to −2.5, or in the range of from −1.16 to −1.95.

For example at 65% of the core shaft maximum take-off speed (i.e. NH=0.65), being E equal to −1.70 and F equal to 0.37, the proportion of heat generated by the power gearbox and the turbomachinery and dissipated to air may be greater than 73.25% (i.e. −1.15−0.65+1.48=0.7325, or 73.25%) and lower than 96.5% (i.e. −1.7040.65−1)+0.37=0.965, or 96.5%).

For example at 100% of the core shaft maximum take-off speed (i.e. NH=1), being E equal to −1.70 and F equal to 0.37, the proportion of heat generated by the power gearbox and the turbomachinery and dissipated to air may be greater than 33% (i.e. −1.15.1+1.48=0.33, or 33%) and lower than 37% (i.e. −1.70 (1−1)+0.37=0.37, or 37%).

In the above embodiments, the core shaft speed NH may be in the range of from 0.65 to 0.95, or in the range of from 0.65 to 0.90, or in the range of from 0.65 to 0.85.

FIGS. 5, 6, 7, and 8 show embodiments of the heat management system 100 according to the disclosure. Like features between FIG. 4 and FIGS. 5-8 are given like reference numerals, and will not be described in detail again in relation to FIGS. 5-8.

Figure 5:
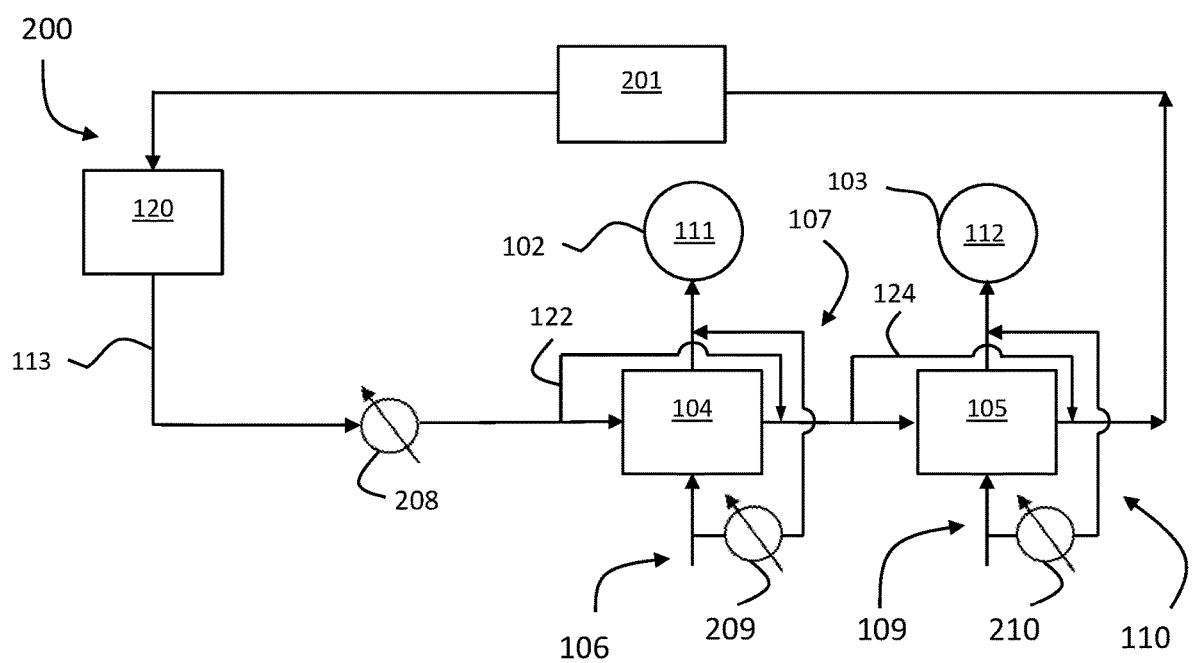
FIG. 5 is a schematic layout of the heat management system according to a first embodiment of the disclosure.

FIG. 5 shows a heat management system 200 where the air-oil heat exchanger 104 and the fuel-oil heat exchanger 105 are arranged in series along the lubricant circuit 113. In detail, the lubricant circuit 113 provides lubrication and cooling to the power gearbox and the turbomachinery bearings. Box 201 represents the power gearbox and the turbomachinery bearings lubricated and cooled by the lubricant in the lubricant circuit 113. In the embodiment illustrated, the air-oil heat exchanger 104 is arranged upstream of the fuel-oil heat exchanger 105 along the lubricant circuit 113. More than one air-oil heat exchanger 104 and more than one fuel-oil heat exchanger 105 may be provided along the lubricant circuit 113. In a non-illustrated embodiment the air-oil heat exchanger 104 may be arranged downstream of the fuel-oil heat exchanger 105 and downstream of the power gearbox and turbomachinery bearings along the lubricant circuit 113.

Cooling air supplied to the air-oil heat exchanger 104 by means of the air circuit 106 represents the first heat sink 102 and may be bypass air or external air, or both. The air circuit 106 comprises an air bypass 107 to vary the air mass flow rate passing across the first heat exchanger 104 and therefore the first amount of heat 111. To this purpose a modulation device 209 is arranged along the air bypass 107. In embodiments, the air bypass 107 may be omitted and the air mass flow rate passing across the first heat exchanger 104 may be varied by means of the modulation device 209 arranged downstream, or upstream of the first heat exchanger 104 along the air circuit 106.

Fuel supplied to the fuel-oil heat exchanger 105 by means of the fuel circuit 109 represents the second heat sink 103. Once the second amount of heat 112 has been transferred from the lubricant to the fuel, the fuel is directed to the combustion equipment for combustion. The fuel circuit 109 comprises a fuel bypass 110 to vary the fuel mass flow rate passing across the second heat exchanger 105 and therefore the second amount of heat 112. To this purpose a modulation device 210 is arranged along the fuel bypass 110.

The heat management system 200 further includes one or more tanks 120 for supplying the lubricant, for example oil, via one or more pumps.

Modulation devices 208, 209, 210 are provided in the lubricant circuit 113, the air circuit 106, and the fuel circuit 109 respectively, to vary the first amount of heat 111 and the second amount of heat 112. The modulation device 208 in the lubricant circuit 113 may be arranged upstream (as illustrated in FIG. 5), or downstream of the heat exchangers 104, 105 and may be one or more pumps, one or more flow control valves, or any other suitable devices adapted to vary the lubricant mass flow rate across the heat exchangers 104, 105. The modulation device 209 in the air circuit 106 may be arranged in the air bypass 107 as illustrated, or downstream of the air-oil heat exchanger 104, and may be one or more compressors, one or more flow control valves, or any other suitable devices adapted to vary the air mass flow rate across the first heat exchanger 104. The modulation device 210 in the fuel circuit 109 may be arranged in the fuel bypass 110 as illustrated, and may be one or more pumps, one or more flow control valves, or any other suitable devices adapted to vary the fuel mass flow rate across the second heat exchanger 105.

To further modulate the first amount of heat 111 and the second amount of heat 112, the lubricant circuit 113 may also comprise bypass circuits to adjust the lubricant mass flow rate passing across the air-oil heat exchanger 104 and/or the fuel-oil heat exchanger 105. In the illustrated embodiment of FIG. 5, the lubricant circuit 113 comprises a first lubricant bypass circuit 122 adapted to divert a portion of lubricant away from the air-oil heat exchanger 104, and a second lubricant bypass circuit 124 adapted to divert a portion of lubricant away from the fuel-oil heat exchanger 105, thereby varying the first amount of heat 111 and the second amount of heat 112. In embodiments, modulation device(s) 208, such as valves, may be arranged along the lubricant bypass circuits 122, 124 to adjust the portion of lubricant passing across the heat exchangers 104, 105, thereby varying the first amount of heat 111 and the second amount of heat 112. In embodiments, either or both of the first lubricant bypass circuit 122 and the second lubricant bypass circuit 124 may be omitted.

Figure 6:
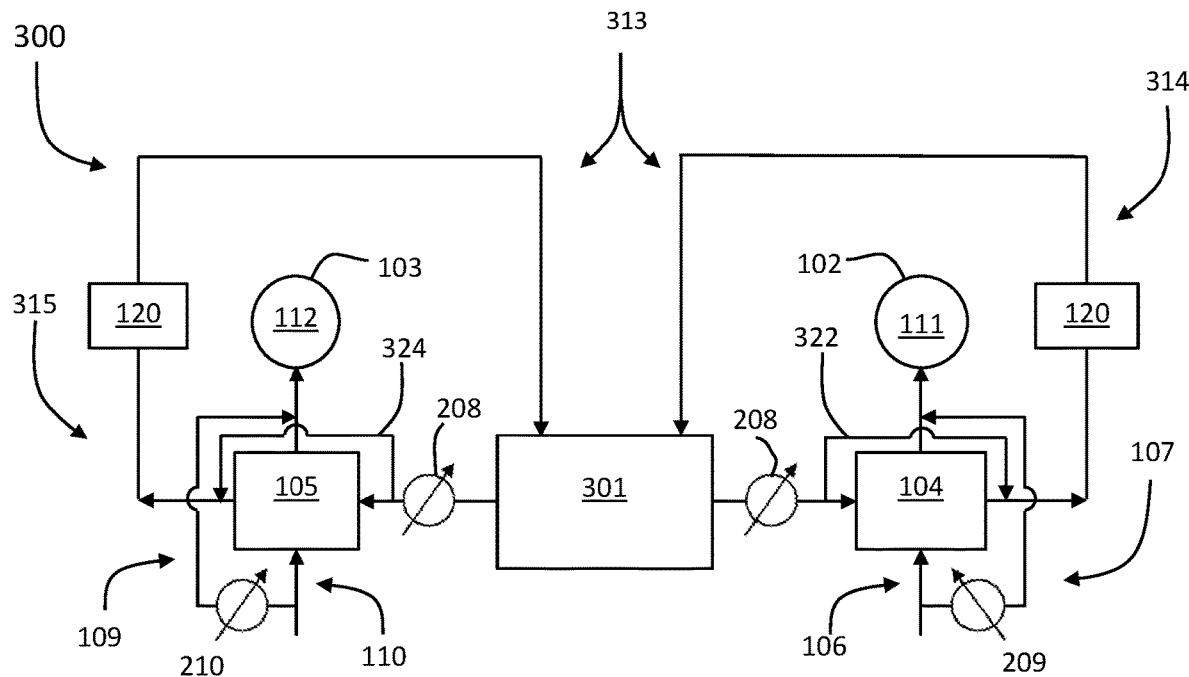
FIG. 6 is a schematic layout of the heat management system according to a second embodiment of the disclosure.

FIG. 6 shows a heat management system 300 wherein the air-oil heat exchanger 104 and the fuel-oil heat exchanger 105 are arranged in parallel in the lubricant circuit 313. In detail, the lubricant circuit 113 provides lubrication and cooling to the power gearbox and turbomachinery bearings. Box 301 represents the power gearbox and the turbomachinery bearings lubricated and cooled by the lubricant. The lubricant circuit 313 comprises a first sub-circuit 314 and a second sub-circuit 315. The first and second sub-circuits form respective first and second loops of the lubricant circuit 313. The first loop and the second loop are arranged in parallel. The first sub-circuit 314 feeds the air-oil heat exchanger 104, and the second sub-circuit 315 feeds the fuel-oil heat exchanger 105.

The air-oil heat exchanger 104 rejects a portion of the heat generated by the power gearbox and turbomachinery bearings corresponding to the first amount of heat 111 to the first heat sink 102. As disclosed with reference to FIGS. 4 and 5, the first heat exchanger 104 is an air-oil heat exchanger and receives cooling air from the air circuit 106 that represents the first heat sink 102. The air circuit 106 comprises the air bypass 107 to adjust the air mass flow rate passing across the air-oil heat exchanger 104 and therefore vary the first amount of heat 111. The air circuit 106, in particular the air bypass 107, further comprises the modulation device 209, for example one or more compressors and/or one or more air flow control valves to control the air mass flow rate passing across the first heat exchanger 104 and therefore vary the first amount of heat 111. One or more additional compressors may be arranged upstream of the air-oil heat exchanger 104 in the air circuit 106 to increase the cooling air pressure.

The fuel-oil heat exchanger 105 rejects the remainder of the heat generated by the power gearbox and turbomachinery bearings corresponding to the second amount of heat 112 to the second heat sink 103. Again, as disclosed with reference to FIGS. 4 and 5, the fuel-oil heat exchanger 105 receives cooling fuel from the fuel circuit 109 that represents the second heat sink 103. The fuel circuit 109 comprises the fuel bypass 110 to adjust the fuel mass flow rate passing across the fuel-oil heat exchanger 105 and therefore vary the second amount of heat 112. The fuel circuit 109, in particular the fuel bypass 110, further comprises the modulation device 210, for example one or more pumps and/or one or more fuel flow control valves to control the fuel mass flow rate passing across the second heat exchanger 105 and therefore vary the second amount of heat 112. One or more additional pumps may be provided in the fuel circuit, either upstream or downstream of the fuel-oil heat exchanger 105.

As illustrated with reference to FIG. 5, either or both of the air bypass 107 and fuel bypass 110 may be omitted and the modulation devices arranged accordingly along the air circuit 106 (either upstream or downstream of the air-oil heat exchanger 104) and the fuel circuit 109 (either upstream or downstream of the fuel-oil heat exchanger 105).

Furthermore, each sub-circuit 314, 315 comprises a lubricant tank 120 and a modulation device 208. In non-illustrated embodiments, one single lubricant tank 120 may feed both the first sub-circuit 314 and the second sub-circuit 315. Each modulation device 208 may be arranged either upstream (as shown in FIG. 6) or downstream of the respective heat exchangers 104, 105.

The lubricant circuit 313 may further comprise lubricant bypass circuits to either or both of the air-oil heat exchanger 104 and the fuel-oil heat exchanger 105. In the illustrated embodiment, the lubricant circuit 313 comprises a first lubricant bypass circuit 322 adapted to divert a portion of lubricant away from the air-oil heat exchanger 104, and a second lubricant bypass circuit 324 adapted to divert a portion of lubricant away from the fuel-oil heat exchanger 105. The first and second lubricant bypass circuit 322, 324 may allow to modulate the first and second amount of heat 111, 112 exchanged at the air-oil heat exchanger 104 and at the fuel-oil heat exchanger 105. To this purpose, one or more modulation devices 208, such as valves, may be provided in the lubricant bypass circuits to adjust the portion of lubricant passing across the heat exchangers 104, 105.

Figure 7:
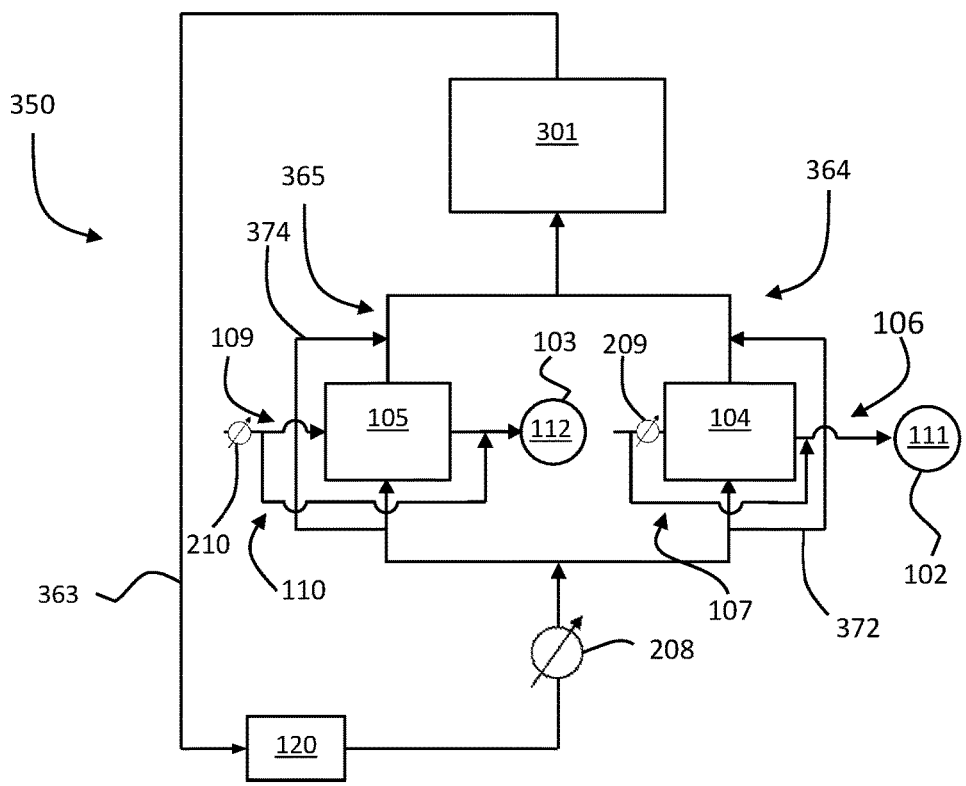
FIG. 7 is a schematic layout of the heat management system according to a third embodiment of the disclosure.

FIG. 7 shows another embodiment of heat management system 350 wherein the air-oil heat exchanger 104 and the fuel-oil heat exchanger 105 are arranged in parallel along the lubricant circuit 363. The lubricant circuit 363 provides lubrication and cooling to the power gearbox and the turbomachinery bearings, illustrated as a box 301 in FIG. 7. The lubricant circuit 363 includes a first sub-circuit, or branch, 364 and a second sub-circuit, or branch, 365.

The air-oil heat exchanger 104 is arranged along the first branch 364 and the fuel-oil heat exchanger 105 is arranged along the second branch 365. More than one air-oil heat exchanger 104 and more than one fuel-oil heat exchanger 105 may be arranged in series along the respective branches.

The heat management system 350 further includes at least one lubricant tank 120 for supplying lubricant, for example oil, via one or more pumps.

The air-oil heat exchanger 104 and fuel-oil heat exchanger 105 may be arranged downstream of the tank 120 and upstream of the power gearbox and turbomachinery bearings (as in the illustrated embodiment), or downstream of the power gearbox and turbomachinery bearings.

Cooling air supplied to the air-oil heat exchanger 104 by means of the air circuit 106 represents the first heat sink 102 and may be bypass air or external air, or both. The air circuit 106 comprises an air bypass 107 to vary the air mass flow rate passing across the air-oil heat exchanger 104 and therefore the first amount of heat 111. In embodiments, the air bypass 107 may be omitted and the air mass flow rate passing across the air-oil heat exchanger 104 may be varied by means of a modulation device arranged downstream, or upstream of the air-oil heat exchanger 104.

Fuel supplied to the fuel-oil heat exchanger 105 by means of the fuel circuit 109 represents the second heat sink 103. Once the second amount of heat 112 has been transferred from the lubricant to the fuel, the fuel is directed to the combustion equipment for combustion. The fuel circuit 109 comprises a fuel bypass 110 to vary the fuel mass flow rate passing across the fuel-oil heat exchanger 105 and therefore the second amount of heat 112.

Lubricant bypass circuits may be provided at the air-oil heat exchanger 104 and/or fuel-oil heat exchanger 105. In the illustrated embodiment the lubricant circuit 363 comprises a first lubricant bypass circuit 372 adapted to divert a portion of lubricant away from the air-oil heat exchanger 104, and a second lubricant bypass circuit 374 adapted to divert a portion of lubricant away from the fuel-oil heat exchanger 105, thereby varying the first amount of heat 111 and the second amount of heat 112. In embodiments, either or both of the first lubricant bypass circuit 372 and the second lubricant bypass circuit 374 may be omitted. Lubricant mass flow rate adjusting devices, such as valves, may be arranged in either or both of the first lubricant bypass circuit 372 and the second lubricant bypass circuit 374 to adjust the lubricant mass flow rate in the respective lubricant bypass circuits and thereby adjust the lubricant mass flow rate passing across the respective heat exchangers.

Modulation devices 208, 209, 210 are provided in the lubricant circuit 363, the air circuit 106, and the fuel circuit 109 respectively, to vary the first amount of heat 111 and the second amount of heat 112. The modulation device 208 in the lubricant circuit 363 may be one or more pumps, one or more flow control valves, or any other suitable devices adapted to vary the lubricant mass flow rate across the heat exchangers. For example, the modulation device 208 may comprise a flow split valve to split the lubricant flow between the first branch 364 and the second branch 365; the modulation device 208 may also comprise modulation valves arranged along either or both of the first lubricant bypass circuit 372 and the second lubricant bypass circuit 374. The modulation device 209 in the air circuit 106 may be arranged in the air bypass 107 upstream of the air-oil heat exchanger 104 as illustrated, or downstream of the air-oil heat exchanger 104, and may be one or more compressors, one or more flow control valves, or any other suitable devices adapted to vary the air mass flow rate across the first heat exchanger 104. The modulation device 210 in the fuel circuit 109 may be arranged in the fuel circuit 109 upstream of the fuel-oil heat exchanger 105 as illustrated, or downstream of the fuel-oil heat exchanger 105, and may be one or more pumps, one or more flow control valves, or any other suitable devices adapted to vary the fuel mass flow rate across the second heat exchanger 105.

Figure 8:
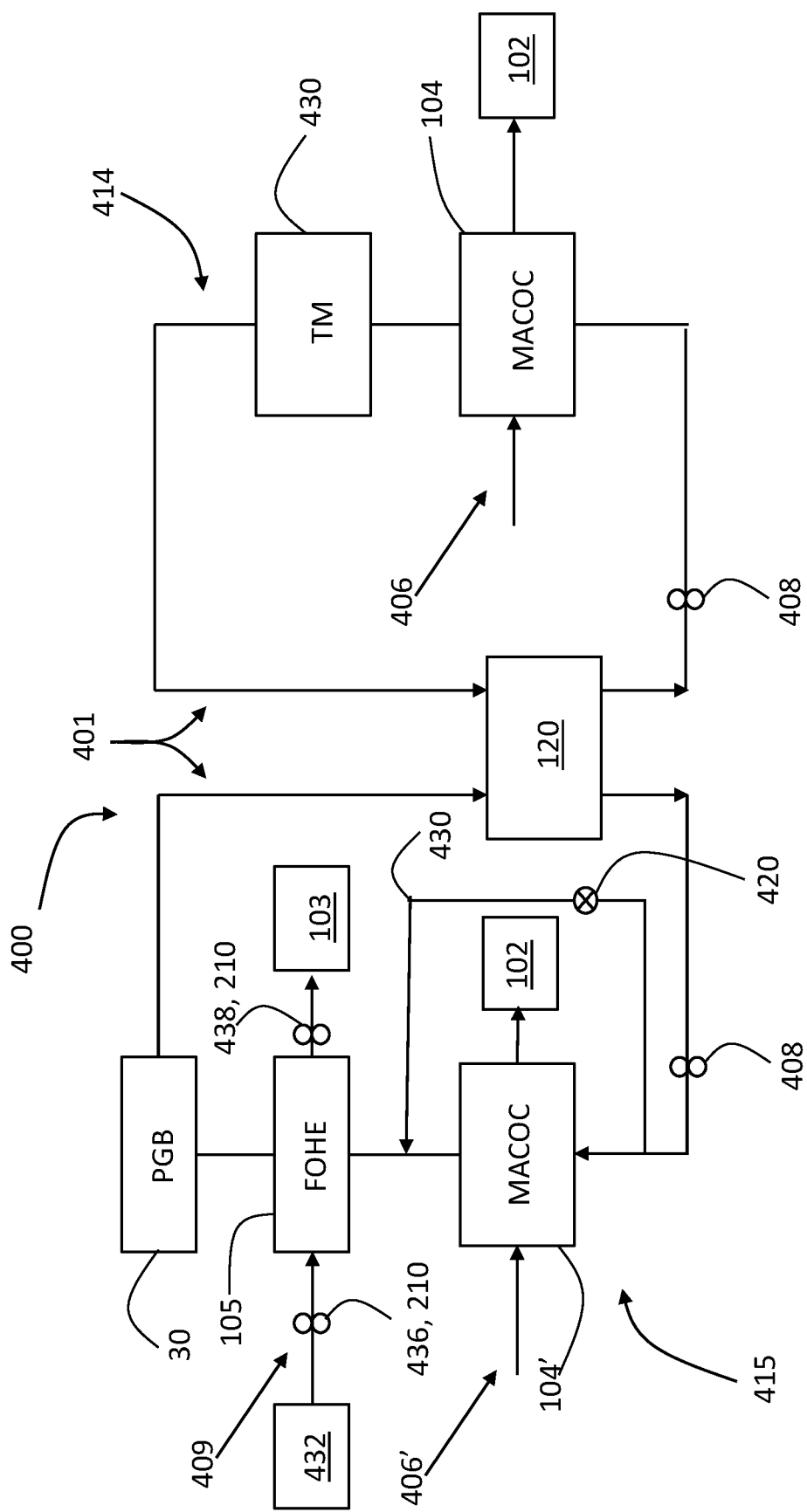
FIG. 8 is a schematic layout of the heat management system according to a fourth embodiment of the disclosure.

FIG. 8 shows a heat management system 400 comprising a pipe assembly 401 adapted to provide lubricant and cooling to a power gearbox 30 and turbomachinery bearings 430. The pipe assembly 401 comprises a tank 120 for supplying lubricant, for example oil, to a first lubricant circuit 414 and a second lubricant circuit 415. In other words, one single tank 120 supplies lubricant to both the first lubricant circuit 414 and the second lubricant circuit 415. In alternative embodiments, each of the first and second lubricant circuits 414, 415 may comprise a dedicated tank 120.

In detail, the first lubricant circuit 414 provides lubrication and cooling to the turbomachinery bearings 430, whereas the second lubricant circuit 415 provides lubrication and cooling to the power gearbox 30.

One or more pumps 408 are provided in the first lubricant circuit 414 to vary the lubricant mass flow rate.

Moreover, a first air-oil heat exchanger 104 is provided to reject the heat generated by the turbomachinery bearings 430 to the first heat sink 102. The air-oil heat exchanger 104 is for example a Matrix Air-Cooled Oil Cooler (MACOC) of the type described with reference to the previous embodiments. As illustrated, a pump 408 may be arranged downstream of the tank 120 and upstream of the air-oil heat exchanger 104.

Cooling air is provided to the first air-oil heat exchanger 104 by means of an air circuit 406. Air provided to the air-oil heat exchanger 104 may be bypass air, for example from downstream of the Fan Outlet Guide Vanes (FOGVs) arranged in the bypass duct 22. In alternative embodiments, air provided to the air-oil heat exchanger 104 may be external air, or a combination of external air and bypass air. In other words, the first heat sink 102 may be bypass air or external air, or both. A modulation device, such as a flow restriction valve, may be arranged along the air circuit 406 downstream of the first air-oil heat exchanger 104.

The first air-oil heat exchanger 104 is arranged downstream of the tank 120 and upstream of the turbomachinery bearings 430. In non-illustrated embodiments, the air-oil heat exchanger 104 may be arranged downstream of the turbomachinery bearings 430 and upstream of the tank 120. The first air-oil heat exchanger 104 may comprise one or more first air-oil heat exchangers 104 arranged in series or in parallel along the first lubricant circuit 414 to reject the heat generated by the turbomachinery bearings 430 to the first heat sink 102.

An additional, or second, air-oil heat exchanger 104', for example an additional MACOC, is arranged in the second lubricant circuit 415 to reject a portion of the heat generated by the power gearbox 30 to the first heat sink 102. An additional air circuit 406' provides cooling air to the second air-oil heat exchanger 104'. Cooling air from the additional air circuit 406' may be bypass air, for example from downstream of the FOGVs arranged in the bypass duct 22, or external air, or a combination of external air and bypass air, as described with reference to the first air-oil heat exchanger 104. A modulation device, such as a flow restriction valve, may be arranged along the additional air circuit 406' downstream of the second air-oil heat exchanger 104'. The second air-oil heat exchanger 104' may comprise one or more second air-oil heat exchangers 104 arranged in series or in parallel along the second lubricant circuit 415 to reject a portion the of the heat generated by the power gearbox 30 to the first heat sink 102.

A lubricant bypass circuit 430 is arranged at the second air-oil heat exchanger 104' to divert part of the lubricant from the second air-oil heat exchanger 104'. To this purpose, an oil flow control valve 420 is arranged in the lubricant bypass circuit 430.

The first air-oil heat exchanger(s) 104 and the second air-oil heat exchanger(s) 104' together reject the first amount of heat 111 to the first heat sink 102. It is to be noted that in the embodiment of FIG. 8 the first amount of heat 111 is the sum of the heat generated by the turbomachinery bearings 430 and part of the heat generated by the power gearbox 30.

Downstream of the second air-oil heat exchanger 104' and the lubricant bypass circuit 430 in the second lubricant circuit 415, there is arranged a fuel-oil heat exchanger 105, for example a Fuel-Oil Heat Exchanger (FOHE) of the type described with reference to the previous embodiments, to reject the second amount of heat 112 to the second heat sink 103, namely cooling fuel. The second amount of heat 112 is the remainder of the heat generated by the power gearbox 30 and not rejected by the second air-oil heat exchanger 104' to the first sink 102. The fuel-oil heat exchanger 105 may comprise one or more fuel-oil heat exchangers 105 arranged in series or in parallel along the second lubricant circuit 415 to reject the second amount of heat 112 generated by the power gearbox 30 to the second heat sink 103.

A fuel circuit 409 provides cooling fuel to the fuel-oil heat exchanger 105. Cooling fuel is supplied to the fuel-oil heat exchanger 105 from a fuel tank 432, for example the fuel tank of the aircraft the gas turbine engine is mounted to, via a low pressure pump 436. Fuel exiting the fuel-oil heat exchanger 105 is then directed to fuel spray nozzles of the combustion equipment 16 via a high pressure pump 438. Fuel flow control valve(s) (not illustrated) may be arranged along the fuel circuit 409, either downstream, or upstream, of the fuel-oil heat exchanger 105.

The power gearbox 30 is arranged downstream of the second heat exchanger 105 along the second lubricant circuit 415. In non-illustrated embodiments, the second air-oil heat exchanger 104' may be arranged downstream of the fuel-oil heat exchanger 105 and upstream of the power gearbox 30.

According to the illustrated embodiment, a pump 408 is arranged along the second lubricant circuit 415 downstream of the tank 120 and upstream of the second air-oil heat exchanger 104'. In non-illustrated embodiments, the pump 408 may be arranged downstream of the second air-oil heat exchanger 104', or downstream of the fuel-oil heat exchanger 105, and upstream of the power gearbox 30.

The heat management systems 200, 300, 350, 400 illustrated with reference to FIGS. 5, 6, 7 and 8 are configured to provide the first amount of heat 111 and the second amount of heat 112 such that the proportions of heat generated by the power gearbox and the turbomachinery and dissipated to air are within the ranges disclosed with reference to FIG. 4.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine for an aircraft comprising:
   an engine core comprising a compressor, a combustor, a turbine, and a core shaft connecting the turbine to the compressor;
   a fan comprising a plurality of fan blades and arranged upstream of the engine core;
   turbomachinery bearings;
   a power gearbox adapted to drive the fan at a lower rotation speed than the turbine; and
   a heat management system configured to provide lubrication and cooling to the power gearbox and turbomachinery bearings, and comprising a pipe assembly, which includes first lubricant circuit and a second lubricant circuit separate from the first lubricant circuit, adapted to provide a lubricant flow to the power gearbox and turbomachinery bearings, at least one first air-lubricant heat exchanger arranged in the first lubricant circuit and configured to dissipate a first amount of heat to a first heat sink, at least one fuel-lubricant heat exchanger arranged in the second lubricant circuit and configured to dissipate a second amount of heat to a second heat sink, and at least one second air-lubricant heat exchanger arranged in the second lubricant circuit and configured to dissipate heat to the first heat sink, wherein the first heat sink is air and the second heat sink is fuel,
   wherein the heat management system is configured to control flow through the at least one first air-lubricant heat exchanger and at least one fuel-lubricant heat exchanger to provide the first amount of heat and the second amount of heat at an environment temperature of ISA +40° C. such that:
   a first proportion of the heat generated by the power gearbox and the turbomachinery bearings and dissipated to air defined as $$\left(\frac{\text{first amount of heat 111}}{\text{first amount of heat 111 + second amount of heat 112}}\right)_{85\% \, MTO}$$

at 85% of a core shaft maximum take-off speed is from 0.55 to 0.70; and
a second proportion of heat generated by the power gearbox and the turbomachinery bearings and dissipated to air defined as $$\left(\frac{\text{first amount of heat 111}}{\text{first amount of heat 111 + second amount of heat 112}}\right)_{65\% \, MTO}$$

at 65% of the core shaft maximum take-off (MTO) speed is from 0.85 to 1.

2. The gas turbine engine of claim 1, wherein the first proportion of the heat generated by the power gearbox and the turbomachinery bearings and dissipated to air at 85% of the core shaft maximum take-off speed at the environment temperature of ISA +40° C. is from 0.60 to 0.70.

3. The gas turbine engine of claim 1, wherein the second proportion of heat generated by the power gearbox and the turbomachinery bearings and dissipated to air at 65% of the core shaft maximum take-off (MTO) speed at the environment temperature of ISA +40° C. is in from 0.90 to 1.

4. The gas turbine engine of claim 1, wherein the heat management system is configured to provide at the environment temperature of ISA +10° C. the first amount of heat and the second amount of heat such that the first proportion of the heat generated by the power gearbox and the turbomachinery bearings and dissipated to air at 85% of the core shaft maximum take-off (MTO) speed is from 0.40 to 0.60.

5. The gas turbine engine of claim 1, wherein the heat management system is configured to provide at the environment temperature of ISA +10° C. the first amount of heat and the second amount of heat such that the second proportion of heat generated by the power gearbox and the turbomachinery bearings and dissipated to air at 65% of the core shaft maximum take-off (MTO) speed is from 0.80 to 0.92.

6. The gas turbine engine of claim 1, wherein the heat management system is configured to provide the first amount of heat and the second amount of heat such that a ratio of the first proportion of the heat generated by the power gearbox and the turbomachinery bearings and dissipated to air at 85% of the core shaft maximum take-off speed at the environment temperature of ISA +40° C. to the first proportion of the heat generated by the power gearbox and the turbomachinery bearings and dissipated to air at 85% of the core shaft maximum take-off speed at the environment temperature of ISA +10° C. is from 1.20 to 1.42.

7. The gas turbine engine of claim 1, wherein the heat management system is configured to provide the first amount of heat and the second amount of heat such that a ratio of the first proportion of the heat generated by the power gearbox and the turbomachinery bearings and dissipated to air at 85% of the core shaft maximum take-off speed at the environment temperature of ISA +40° C. to the first proportion of the heat generated by the power gearbox and the turbomachinery bearings and dissipated to air at 85% of the core shaft maximum take-off speed at the environment temperature of ISA −69° C. is from 1.5 to 4.5.

8. The gas turbine engine of claim 1, wherein the heat management system is configured to provide the first amount of heat and the second amount of heat such that a ratio of the second proportion of the heat generated by the power gearbox and the turbomachinery bearings and dissipated to air at 65% of the core shaft maximum take-off speed at the environment temperature of ISA +40° C. to the second proportion of the heat generated by the power gearbox and the turbomachinery bearings and dissipated to air at 65% of the core shaft maximum take-off speed at the environment temperature of ISA +10° C. is from 1.10 to 1.25.

9. The gas turbine engine of claim 1, wherein the heat management system is configured to provide the first amount of heat and the second amount of heat such that a ratio of the second proportion of the heat generated by the power gearbox and the turbomachinery bearings and dissipated to air at 65% of the core shaft maximum take-off speed at the environment temperature of ISA +40° C. to the second proportion of the heat generated by the power gearbox and the turbomachinery bearings and dissipated to air at 65% of the core shaft maximum take-off speed at the environment temperature of ISA −69° C. is from 1.1 to 2.1.

10. The gas turbine engine of claim 1, wherein
the heat management system is configured to provide at the environment temperature of ISA +10° C. the first amount of heat and the second amount of heat such that a ratio of the first proportion to the second proportion is from 0.45 to 0.65.

11. The gas turbine engine of claim 1, wherein the heat management system is configured to provide at the environment temperature of ISA −69° C. a ratio of the first proportion of the heat generated by the power gearbox and the turbomachinery bearings and dissipated to air at 85% of the core shaft maximum take-off speed to the second proportion of the heat generated by the power gearbox and the turbomachinery bearings and dissipated to air at 65% of the core shaft maximum take-off speed in from 0.30 to 0.55.

12. The gas turbine engine of claim 1, wherein the combustor is a lean burn combustor.

13. The gas turbine engine of claim 1, wherein the heat management system further includes a modulation device adapted to adjust a lubricant flow distribution between the power gearbox and the turbomachinery bearings.

14. The gas turbine engine of claim 1, wherein the fan has a fan diameter from 210 cm to 380 cm.

15. The gas turbine engine of claim 1, wherein the power gearbox has a gear ratio from 2.9 to 4.0.

16. The gas turbine engine of claim 1, wherein the fan has a fan diameter from 210 cm to 230 cm and the power gearbox has a gear ratio from 3.2 to 4.2.

17. A method of operating a gas turbine engine for an aircraft, the method comprising providing the gas turbine engine comprising:
an engine core comprising a compressor, a combustor, a turbine, and a core shaft connecting the turbine to the compressor;
a fan comprising a plurality of fan blades and arranged upstream of the engine core;
turbomachinery bearings;
a power gearbox adapted to drive the fan at a lower rotation speed than the turbine; and
a heat management system configured to provide lubrication and cooling to the power gearbox and turbomachinery bearings, and comprising a pipe assembly, which includes first lubricant circuit and a second lubricant circuit separate from the first lubricant circuit, adapted to provide a lubricant flow to the power gearbox and turbomachinery bearings, at least one first air-lubricant heat exchanger arranged in the first lubricant circuit and configured to dissipate a first amount of heat to a first heat sink, at least one fuel-lubricant heat exchanger arranged in the second lubricant circuit and configured to dissipate a second amount of heat to a second heat sink, and at least one second air-lubricant heat exchanger arranged in the second lubricant circuit and configured to dissipate heat to the first heat sink;
wherein the first heat sink is air and the second heat sink is fuel;
wherein a first proportion of the heat generated by the power gearbox and the turbomachinery bearings and dissipated to air is defined as $$\left(\frac{\text{first amount of heat 111}}{\text{first amount of heat 111} + \text{second amount of heat 112}}\right)_{85\% \, MTO}$$

at 85% of a core shaft maximum take-off speed; and
a second proportion of heat generated by the power gearbox and the turbomachinery bearings and dissipated to air is defined as $$\left(\frac{\text{first amount of heat 111}}{\text{first amount of heat 111} + \text{second amount of heat 112}}\right)_{65\% \, MTO}$$

at 65% of the core shaft maximum take-off (MTO) speed;
wherein the method comprises controlling flow through the at least one first air-lubricant heat exchanger and the at least one fuel-lubricant heat exchanger to provide the first amount of heat and the second amount of heat such that at an environment temperature of ISA +40° C. the first proportion is from 0.55 to 0.70, and the second proportion is from 0.85 to 1.

18. The method of claim 17, wherein at the environment temperature of ISA +40° C. the first proportion is from 0.60 to 0.70.

19. The method of claim 17, wherein at the environment temperature of ISA +40° C. the second proportion is from 0.90 to 1.

20. The method of claim 17, comprising controlling the flow through the at least one first air-lubricant heat exchanger and the at least one fuel-lubricant heat exchanger to provide the first amount of heat and the second amount of heat such that a ratio of the first proportion of the heat generated by the power gearbox and the turbomachinery bearings and dissipated to air at 85% of the core shaft maximum take-off speed at the environment temperature of ISA +40° C. to the first proportion of the heat generated by the power gearbox and the turbomachinery bearings and dissipated to air at 85% of the core shaft maximum take-off speed at the environment temperature of ISA +10° C. is from 1.20 to 1.42.

* * * * *